United States Patent
Markham et al.

(10) Patent No.: US 11,782,943 B2
(45) Date of Patent: Oct. 10, 2023

(54) METHOD AND SYSTEM FOR CASE MANAGEMENT

(71) Applicant: Salesforce, Inc., San Francisco, CA (US)

(72) Inventors: Claire Markham, San Francisco, CA (US); Daniel Walton Venor, Encinitas, CA (US); Sophia Dias, San Francisco, CA (US); Ashwin Nitin Mogral, Fremont, CA (US); Gagan Puneet Kaur Sandhu, Fremont, CA (US); Monica Ramachandran, Mahwah, NJ (US); Tarren James Anderson, Burnsville, MN (US); Bethany Breisnes, Vancouver (CA); Scott Thomas Pelak, Grand Rapids, MI (US); Willi Watkins, Chicago, IL (US); Bharathi Muniswamy, Clarksville, MD (US); Kelley A. Bevans, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 443 days.

(21) Appl. No.: 16/777,715

(22) Filed: Jan. 30, 2020

(65) Prior Publication Data
US 2021/0150439 A1    May 20, 2021

Related U.S. Application Data

(60) Provisional application No. 62/937,172, filed on Nov. 18, 2019.

(51) Int. Cl.
G06Q 10/06 (2023.01)
G06F 16/25 (2019.01)
(Continued)

(52) U.S. Cl.
CPC ........ G06F 16/252 (2019.01); G06F 16/2379 (2019.01); G06Q 10/06316 (2013.01);
(Continued)

(58) Field of Classification Search
None
See application file for complete search history.

(56) References Cited

U.S. PATENT DOCUMENTS

2004/0117361 A1   6/2004  Greer et al.
2014/0229488 A1   8/2014  Arngren et al.
(Continued)

OTHER PUBLICATIONS

Salesforce, "How to Be Successful with Salesforce—User Guide, Winter'18," Section: Sales Productivity —Notes, Nov. 3, 2017, 15 pages (Tilte Page Copyright Page, Table of Contents, and pp. 2280-2286).
(Continued)

*Primary Examiner* — Alan Torrico-Lopez
(74) *Attorney, Agent, or Firm* — Nicholson, De Vos, Webster & Elliott, LLP

(57) ABSTRACT

A method and a case management system are described. The case management system enables the user to generate and update a case plan for a client of an organization. The case plan includes a set of goals and a set of action items for each one of the goals that are defined based on goal templates and action item templates.

18 Claims, 23 Drawing Sheets

(51) Int. Cl.
  *G06Q 30/016* (2023.01)
  *G06F 16/23* (2019.01)
  *G06Q 10/0631* (2023.01)
  *G06Q 10/10* (2023.01)
  *G06F 40/174* (2020.01)

(52) U.S. Cl.
  CPC ..... *G06Q 10/063114* (2013.01); *G06Q 10/10* (2013.01); *G06Q 30/016* (2013.01); *G06F 40/174* (2020.01)

(56) References Cited

U.S. PATENT DOCUMENTS

| | | | |
|---|---|---|---|
| 2015/0128020 A1 | 5/2015 | Chavez et al. | |
| 2016/0086500 A1* | 3/2016 | Kaleal, III | A61B 5/41 434/257 |
| 2017/0323243 A1* | 11/2017 | Knight | G06Q 10/1097 |
| 2019/0113973 A1* | 4/2019 | Coleman | G06N 20/00 |
| 2019/0148025 A1* | 5/2019 | Stone | G16H 20/17 705/2 |
| 2020/0192534 A1 | 6/2020 | Wong et al. | |
| 2020/0364724 A1 | 11/2020 | Pulugurtha et al. | |
| 2021/0090451 A1* | 3/2021 | Frist, Jr. | G09B 5/12 |
| 2021/0149908 A1 | 5/2021 | Markham et al. | |

OTHER PUBLICATIONS

Stevens-Kittner, Norah, "Announcing Program Management Innovations in Nonprofit Cloud", Salesforce.org, retrieved from the Internet: https://www.salesforce.org/announcing-program-management-innovations-in-nonprofit- cloud/, Oct. 17, 2019, 4 pages.
Non-Final Office Action, U.S. Appl. No. 16/777,662, dated Sep. 28, 2021, 25 pages.
Final Office Action, U.S. Appl. No. 16/777,662, dated Mar. 21, 2022, 28 pages.
Eccovia Solutions, "Platform", retrieved from the Internet: https://eccoviasolutions.com/care-coordination- platform/, 2019, 5 pages.
Advisory Action, U.S. Appl. No. 16/777,662, dated Jun. 10, 2022, 3 pages.
Non-Final Office Action, U.S. Appl. No. 16/777,662, dated Aug. 18, 2022, 27 pages.
Advisory Action, U.S. Appl. No. 16/777,662, dated Jun. 21, 2023, 3 pages.
Final Office Action, U.S. Appl. No. 16/777,662, dated Apr. 14, 2023, 20 pages.

* cited by examiner

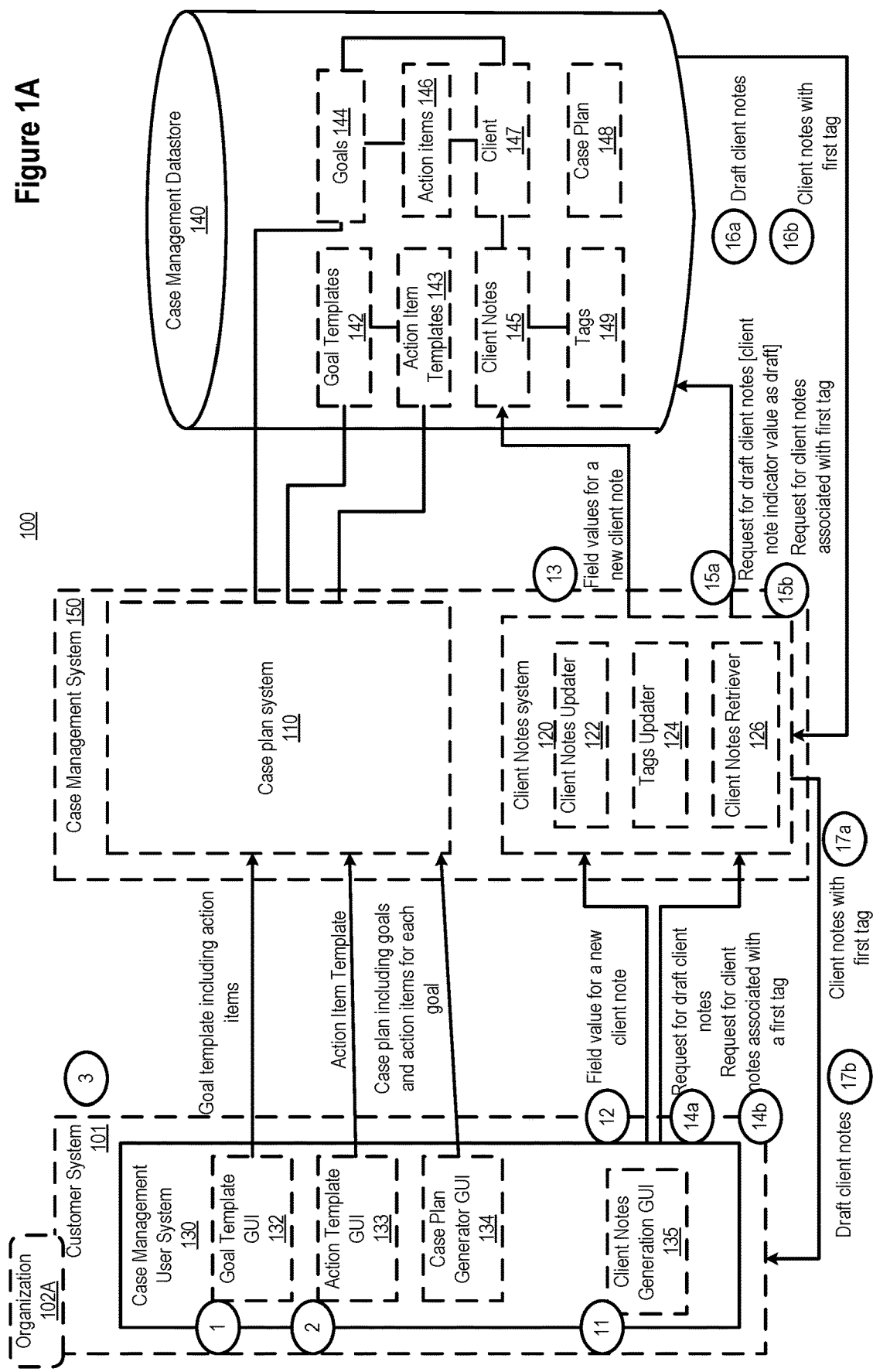

Figure 2A

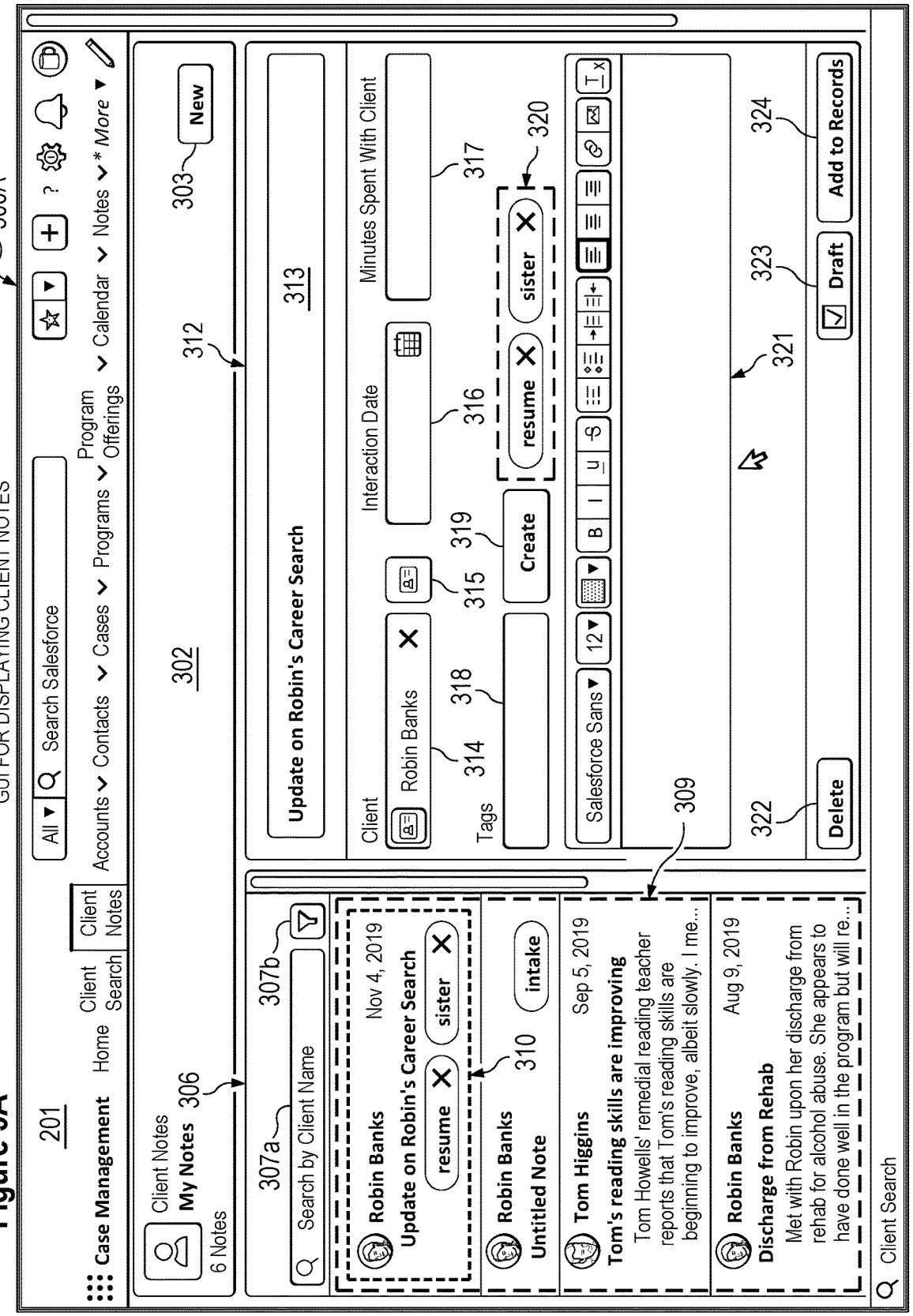

```
┌─────────────────────────────────────────────────────────────────────────┐
│ PROMPT A USER OF A CASE MANAGEMENT SYSTEM TO ENTER A SEARCH CRITERIA FOR │
│ CLIENT NOTES THAT INCLUDE A FIRST TAG ASSOCIATED WITH ONE OR MORE CLIENT │
│   NOTES AND A DRAFT INDICATOR THAT INDICATES THAT THE CLIENT NOTE IS    │
│                           NOT COMPLETED                                  │
│                                412                                       │
└─────────────────────────────────────────────────────────────────────────┘
                                    │
                                    ▼
┌─────────────────────────────────────────────────────────────────────────┐
│              RECEIVE THE SEARCH CRITERIA FOR THE CLIENT NOTES            │
│                                414                                       │
└─────────────────────────────────────────────────────────────────────────┘
                                    │
                                    ▼
┌─────────────────────────────────────────────────────────────────────────┐
│ RETRIEVE FROM A DATASTORE ONE OR MORE CLIENT NOTES THAT SATISFY THE      │
│   SEARCH CRITERIA THAT INCLUDES THE FIRST TAG AND THE DRAFT INDICATOR    │
│                                416                                       │
└─────────────────────────────────────────────────────────────────────────┘
```

GUI FOR VIEWING THE CASE PLAN

500G

201 | All ▼ | 🔍 Search Salesforce

::: Case Management Home | Client Search | Client Notes | Accounts ▼ | Contacts ▼ | Cases ▼ | Programs ▼ | Program Offerings ▼

Case Plan
Case Plan for Robin Banks

Contact: Robin Banks
Owner: 👤 User User

Printable View | *Case Plan for Robin Banks ✕ | Change Owner

Created By: 👤 User User, 11/11/2019, 5:50 PM
Last modified By: 👤 User User, 11/11/2019, 5:50 PM
Total Goals: 6
Edit | Description ＋ New Goal ∨ Develop basic financial literacy skills — 0/5 Action Items Complete ✎

Month 2: Meet Financial Advisor beginning of month — Due Date: — (Not Started)

Month 1: Meet Financial Advisor beginning of month — Due Date: — (Not Started)

Open a bank account — Due Date: — (Not Started)

Month 1: Deposit 10% of income to savings account - end of month — Due Date: — (Not Started)

Month 5: Meet Financial Advisor beginning of month — Due Date: — (Not Started)

＞ Get and keep job for 6 - 12 months — 0/5 Action Items Complete ✎

Figure 5G

GUI FOR UPDATING THE CASE PLAN

500H

201

Case Management Home | Client Search | Client Notes | All ▼ | 🔍 Search Salesforce | Accounts ▼ | Contacts ▼ | Cases ▼ | Programs ▼ | Program Offerings ▼ | ☆ ▶ | *Case Plan for Robin Banks ✕

Case Plan
Case Plan for Robin Banks

| Contact | Owner | Printable View | Edit | Change Owner |
|---|---|---|---|---|
| Robin Banks | 👤 User User | | | |

Created By
👤 User User, 11/11/2019, 5:50 PM

Last modified By
👤 User User, 11/11/2019, 5:50 PM

Total Goals  Description
6

▼ + New Goal

▼ Get a job
  0/5 Action Items Complete
  Not Started

Apply for job
  Update resume|
  Not Started  0/5 Action Items Complete

+ Add Action Item

Cancel   Save

▶ Develop basic financial literacy skills
  0/5 Action Items Complete
  Due Date: Not Started Month 2: Meet Financial Advisor beginning of month

Figure 5H

```
STORE THE CASE PLAN AS A FIRST SET OF ONE OR MORE RECORDS IN THE CASE
MANAGEMENT DATASTORE BASED ON THE SUBSET OF GOAL TEMPLATES, THE SUBSET OF
              ACTION ITEM TEMPLATES, AND THE CASE PLAN NAME
                                  620

STORE THE CASE PLAN AS A CASE PLAN RECORD IN A CASE PLAN DATABASE OBJECT,
         WHERE THE CASE PLAN RECORD INCLUDES AN IDENTIFIER OF THE CLIENT
                                    622

│
              ▼

STORE THE SUBSET OF GOAL TEMPLATES FOR THE CASE PLAN AS A SECOND SET OF
            ONE OR MORE RECORDS IN THE CASE MANAGEMENT DATASTORE
                                  624

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
     STORE IN A GOALS DATABASE OBJECT EACH GOAL TEMPLATE OF THE SUBSET
   │ OF GOAL TEMPLATES AS A GOAL RECORDS THAT INCLUDES AN IDENTIFIER OF     │
                              THE CASE PLAN RECORD
   │                                625                                    │
   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

│
              ▼

STORE THE SUBSET OF ACTION ITEM TEMPLATES FOR THE CASE PLAN AS A THIRD
         SET OF ONE OR MORE RECORDS IN THE CASE MANAGEMENT DATASTORE
                                  626

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
    STORE IN AN ACTION ITEMS DATABASE OBJECT EACH ACTION ITEM TEMPLATE
   │   OF THE SUBSET OF ACTION ITEM TEMPLATES AS AN ACTION ITEM RECORD      │
                THAT INCLUDES AN IDENTIFIER OF THE CASE PLAN RECORD
   │                                627                                    │
   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 6B

METHOD AND SYSTEM FOR CASE MANAGEMENT

CROSS-REFERENCE TO RELATED APPLICATIONS

This application claims the benefit of U.S. Provisional Application No. 62/973,172, filed Nov. 18, 2019, which is hereby incorporated by reference.

TECHNICAL FIELD

One or more implementations relate to the field of case management systems; and more specifically, to record client notes and generate case plans for a client.

BACKGROUND ART

Nonprofit organizations and similar entities offer one or more service to a set of clients. The clients of the nonprofit organization are beneficiaries of these services and generally interact with one or more case managers of the nonprofit organization. A case manager may use a case management tool to track the clients and the services offered to these clients. A case management tool typically allows the case manager (e.g., an employee of the nonprofit organization or a contractor) to view and/or modify data related to one or more clients such as programs that the clients are enrolled in, demographic data of the client, etc.

Case management systems can be services offered in a multi-tenant cloud computing platform. A multi-tenant cloud computing platform supports one or multiple services that are made available to tenants of the multi-tenant cloud computing platform. The services are sets of functions, applications, and/or resources that may be made available on-demand to the tenants of the multi-tenant cloud computing platform. The tenants of the multi-tenant cloud computing platform can leverage these services to support their organization. Thus, an organization of a tenant does not need to be concerned with building and/or maintaining the provided services, but instead makes use of the services when needed (e.g., in response to a demand from a tenant). The services may communicate with each other and/or with one or more electronic devices external to the multi-tenant cloud computing platform via one or more Application Programming Interfaces (APIs) (e.g., a Representational State Transfer (REST) API).

The multi-tenant cloud computing platform can also provide a set of resources to tenants. For example, the resources may include a set of databases and the services use data stored within the set of databases. The set of databases may each comprise one or more database objects that are managed by a Database Management System (DBMS). Each database object may include a number of records and each record may comprise a set of fields.

A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object).

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 1A is a block diagram of a system that includes a case management system.

FIG. 2A illustrates an exemplary graphical user interface (GUI) that allows a user to add a new client note.

FIG. 3A illustrates an exemplary GUI that allows a user to add a new client note.

FIG. 4B illustrates a flow diagram of exemplary operations for searching a client note.

FIG. 5B illustrates an exemplary GUI that can be used by a user for selecting a program.

FIG. 5G illustrates an exemplary GUI that can be used by a user for viewing a case plan.

FIG. 5H illustrates an exemplary GUI that can be used by a user for viewing and/or updating a case plan.

FIG. 6B illustrates a flow diagram of exemplary operations performed for storing a case plan in the datastore 140, in accordance with some implementations.

DETAILED DESCRIPTION

Figure 1B:
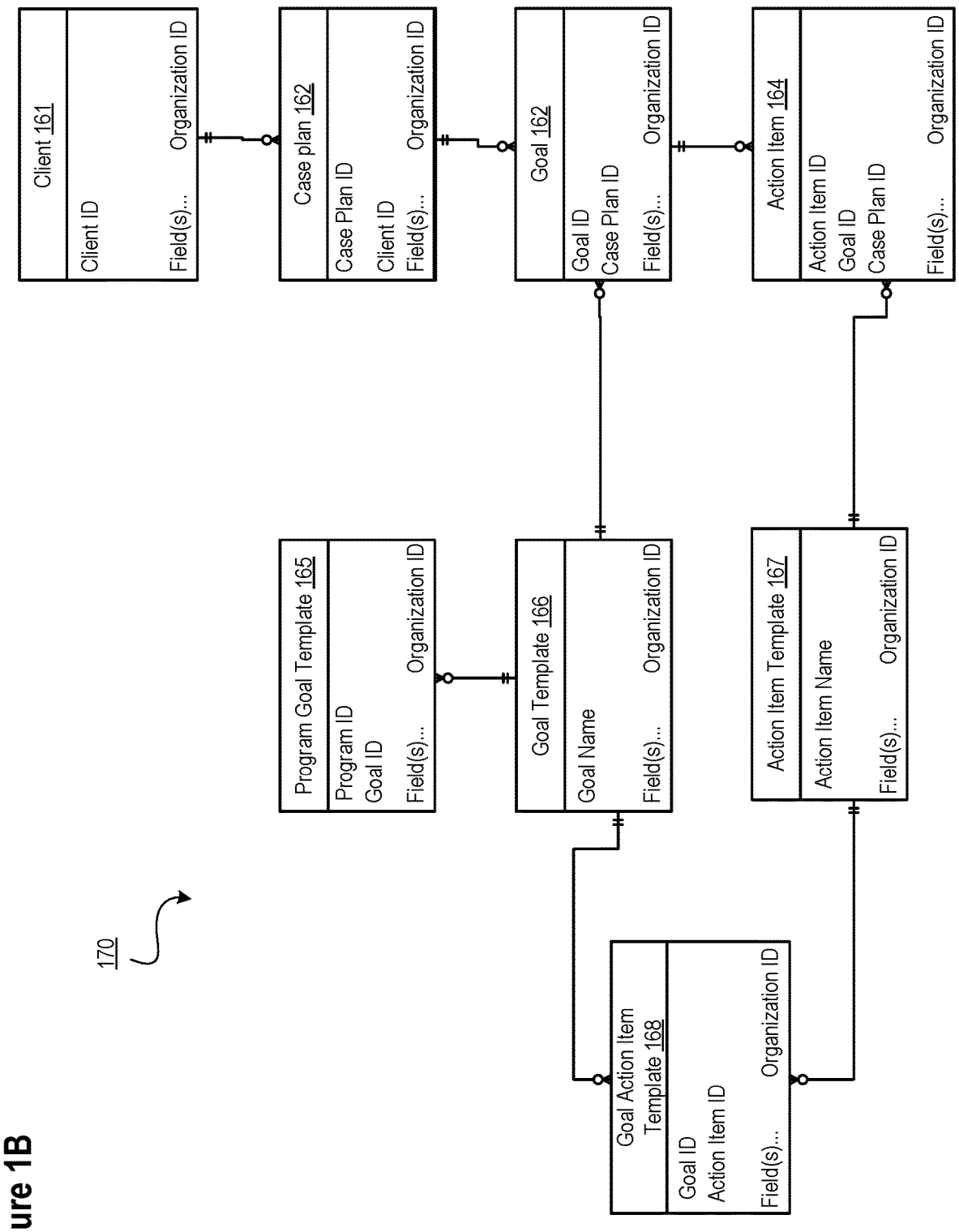
FIG. 1B illustrates a data model that can be used in a case management system according to some example implementations.

The following description describes a method and a case management system that provide case plan management and recordation of client notes for clients.

In the following description, numerous specific details such as implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

FIG. 1A is a block diagram of a system that includes a case management system. The case management system 150 includes a case plan system 110 and a client notes system 120. In some implementations, the case management system 150 may include only the case plan system 110 or only the client notes system 120. In other implementations, the case management system may include each one of the case plan system 110 and the client notes system 120. In these implementations, the case plan system 110 and the client notes system 120 are used in combination to offer a case management service to users of a tenant. The case management system 150 can include additional elements and subsystems that are not illustrated or further discussed herein. The components of the case management system 150 and related systems illustrated FIG. 1A are shown for sake of clarity and conciseness. One skilled in the art would appreciate that these systems and components would include additional components and systems.

The case management system 150 allows users of an organization to log and track information related to clients, interactions with the clients, programs in which the clients are enrolled, and/or case plans set for these clients. The case management system 150 interfaces with a set of customer systems (e.g., customer system 101). The case management system 150 can be built based on a data model that includes data objects and relationships defined between these data objects that allow the logging and tracking of case management for clients of an organization. The data model may include a contact/client object and a user object. The data model may further include an account object, an address object. The data model may further include a client note object, a client note relationship object, a case object and a case team object. The case management data model may further include a case plan object, a goal object, an action item object, an action item template object, a goal template object, a program goal template object, and a goal action item template object. The data model further includes multiple relationships that link the objects. For example, a client (contact object) can be linked to the case plan object, to the account object, the user object, the client note object, the address object. The relationship between two objects can be master-detail or lookup relationship. While a number of objects and their relationship are described, the case management system 150 may be implemented based on a different data model that may include more of fewer objects than the ones described herein.

FIG. 1B illustrates a data model that can be used in a case management system according to some example implementations. In the following description data model and data object model can be interchangeably used without departing from the scope of the implementations described herein. The data model 170 may include a client object 161, a case plan object 162, a goals object 163, an action items object 164, a goal template object 166, an action item template object 167, a program goal template object 165, and a goal action item template object 168. The data model 170 further includes multiple relationships that link the objects. For example, a client object is linked to the case plan object. The case plan object is linked to the goals object. The goals object is linked to the action items object and to the goal templates object. The action items object is linked to the goal object and to the action item templates object. The action item templates object is linked to the action items object and to the goal action item templates object. The goal templates object is linked to the goals object, to the program goal templates object, and to the goal action item templates object. The goal action item templates object is linked to the goal templates object and to the action item templates object. While a number of objects and their relationship are described, the case management system 150 may be implemented based on a different data model that may include more of fewer objects than the object of data model 170.

Each one of the objects may include one or more fields. The client object 161 represents a client that receives services and for which a case plan can be generated by a user of the case management system 150. The client object 161 may include a client identifier field that uniquely identifies a client record in the datastore 140. The client object 161 may include one or more additional fields (not illustrated in FIG. 1B). The case plan object 162 represents a case plan that is generated for a client through the case management system 150. The case plan object 162 includes a case plan identifier field that uniquely identifies the case plan in the datastore 140, a client identifier field that identifies the client for which the case plan is being generated. The case plan object 162 may include a field for the number of goals that are selected for the case plan. The case plan object 162 may include a status field for storing the status of the case plan for the client. The case plan object 162 may include one or more additional fields (not illustrated in FIG. 1B). The goal object 163 represents goals that can be determined as part of a case plan for a client in the case management system 150. The goal object 163 may include a goal identifier field to store an identifier that uniquely identifies a goal in the datastore 140, a case plan identifier field to store an identifier that identifies the plan for which the goal is selected. The goal object 163 may include one or more additional fields (not illustrated in FIG. 1B). For example, the goal object 163 may include a goal name field, a completed action items field, a client field, a goal template field, an incomplete action items field, a progress field, etc. The action item object 164 represents action items that need to be performed to achieve a goal of a case plan for a client in the case management system 150. The action item object 164 may include an action item identifier field to store an identifier that uniquely identifies an action item in the datastore 140, a goal identifier field to store an identifier that identifies the goal for which the action item is selected by a user, and a case plan identifier that identifies the plan for which the goal is selected by the user. The action item object 164 may include one or more additional fields (not illustrated in FIG. 1B). For example, the action item object 164 may include an action item name field, a due date field, a client field, an action item template field, and a status field, etc. The goal template object 166 represents a template of a goal that can be used to determine goals for a case plan, when the case plan is generated. The goal template object 166 includes a goal name field. The action item template object 167 represents a template of an action item that can be used to determine action items for each one of the goals for a case plan, when the case plan is generated. The action item template object 167 includes an action item name field. The program goal template object 165 and the goal action item template object 168 are used to tie together the object listed. The program goal template object 165 connects programs to goals, and the goal action item template object 168 connects goals to action items. The program goal template 165 includes a goal field and a program field to respectively store an identifier of a goal and an identifier of a program and tie the identified goal and program together. The goal action item template 168 includes a goal identifier field and an action item identifier field, which ties the identified goal and action item together.

In some implementations, the record stored in the database objects of FIG. 1A can be modeled according to the objects illustrated in FIG. 1B. For example, the records in each one of the client database object 147, the goals database object 144, the action items database object 146, the case plan database object 148, the goal templates database object 142, and the action item templates database object 143 can have the format as defined by the client object 161, the goal object 162, the action item object 164, the case plan object 162, the goal template object 166, and the action item template object 167 respectively. Additionally or alternatively, one or more of the database objects illustrated in FIG. 1A may have a different format than the one discussed with reference to FIG. 1B.

In some implementations, each one of the data objects can correspond to a database object stored in datastore 140. Each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). For example, the datastore 140 may include the client database object 147, the action items database object 146, the goals database object 144, the action item template database object 143, the goal template object 142, a client notes object 145, and a tags object 149. In other implementations, each data object (e.g., the data objects of the data model 170) can correspond to multiple database objects stored in the datastore 140. For simplicity and ease of understanding each data object is represented with a single database object in the datastore 140, however, instances of the data object may be stored as one or multiple records in one or multiple database objects respectively. The relationship between two objects can be master-detail or lookup relationship.

In the following description an organization refers to an entity for which an instance of a case management service can be deployed. The organization typically includes multiple users. Each user may have a role within the organization. For example, a user can be an administrator of the system that is allowed to modify and update different features of the case management system 150. In another example, a user can be a case manager that is allowed to view, update, and add data related to case management. A user can be represented with the user object. As it will be described in further details below a case manager can manage and follow the progress of one or more services offered to a client of the organization through the case management system 150. In the description herein, implementations will be described with respect to users and/or clients of a single organization. However, one of ordinary skill in the art would understand that the case management system may be implemented in a multi-tenant context and in that case the implementations described herein can be performed to support users and clients of multiple organizations.

In the following description a client object 161 refers to a representation of a person that is to receive services. A client refers to a particular instance of the client object (i.e., a particular person). The services can be offered by the organization or by other organizations and entities different from the organization. A client object 161 may include one or more of the following fields a name field, an email field, a birthdate field, one or more phone number fields, a mailing address field, a client identifier field, which is a text field to store a customer facing client ID, an emergency contact field, an emergency contact phone number field, a photo file identifier field, a preferred communication method field, a client indicator field that indicates the contact has the role of client, a watch list field used to indicate the client has special considerations, a watch list date field that indicates the date the client was placed on the watchlist. In some implementations, a client may be enrolled in one or more programs. When a client is enrolled in a program, a case manager may follow the progress of the client in relation with the program. The type of programs may depend on the type of the organization to which the case manager belongs. For example, the programs can include a job search program, a job readiness program, a literacy program, an afterschool program, a nutrition program, a mental health program, etc. An account object refers to a representation of a set of clients that can be linked as being part of a same group. For example, an account can represent a set of clients that belong to a same household (e.g., a same family, persons living at a same address (e.g., roommates), clients that are recipients of a same service, etc.).

The customer system 101 may include one or more computing devices on which a case management user system 130 runs. The case management user system 130 provides an interface or 'front-end' to access and enter data into the case management system 150. A user of a customer system 101 can interact with one or more components of the case management system 150 through the user interface provided by the case management user system 130. The case management user system 130 can be a specialized local client application or a general-purpose application such as web browsers. The user that belongs to organization 102A can use the customer system to enter goal templates, action templates, goals, and actions. The user can further use the customer system to enter one or more field values of a new client note, and request based on selection criteria one or more client notes stored. Any number of customer systems can interface with separate instances of the case management system 150 via an API of the case management system 150.

In the following description exemplary graphical user interfaces (GUIs) will be illustrated in FIGS. 2A-3E and described in the following description. The exemplary GUIs will be illustrated as web pages within a web browser. These GUIs are intended to be illustrative and should not be considered as a limitation. Other exemplary GUIs can be used. For example, the GUI can be displayed within a web browser of a mobile device (e.g., web browser of a smartphone). In another example, the GUIs can be displayed on a standalone application (also referred to as "app") running on a mobile device, or running on a desktop device. Other examples can be contemplated without departing from the scope of the implementations described herein.

As it will be described in further detail herein, the components of FIG. 1A may allow users of the case management system to generate and/or view a case plan for a client; and/or generate and view client notes for a client.

A client notes system 120 is illustrated as part of the case management system 150 and interfacing with a case management user system 130 by way of example and not limitation. The functions of client notes system 120 could be separately implemented or integrated into other components in other configurations and arrangements. For example, the client notes system 120 can be integrated with case plan system 110 within the case management system 150. The client notes system 120 is operative to handle generation, update, and management of objects and records for one or more of the client note, the client note relationship, in relation with client object and client records.

In some implementations, a user of the case management system 150 is prompted to enter field values for a new client note through a graphical user interface. The field values for the new client note that include an identifier of the client for which the new client note is generated, one or more tags for the new client note, and a draft indicator that indicators whether the new client note is a draft or not are transmitted (e.g., through an API call) to the client notes system 120 (at operation 12). Upon receipt of the field values, the client notes system 120 (through the client notes updater 122 and/or the tags updater) stores (operation 13) the field values in the case management datastore 140. The field values are stored in the case management datastore 140 by updating or inserting one or more field values of records in the datastore 140. For example, the client notes system 120 may update the client notes object 145, the tags database object 149, the client database object 147, and/or additional database objects that are not illustrated. In some implementations, the field values can be field values of a record of client note object. In other implementations, the field values received can be field values of a record of client note object in addition to field values of one or more records of another object (e.g., tag(s) object).

A user of a case management system enters search criteria for client notes that include a first tag associated with one or more client notes and a draft indicator that indicates that the client note is not completed. In some implementations, the search criteria may include one or more tags. In some implementations, the search criteria may include the indicator that the client note is a draft. In other implementations, the search criteria may include one or multiple ones of the draft indicator, the tags, a client name, and other parameter values. Upon receipt of the search criteria, one or more client notes that satisfy the selection criteria that includes the first tag and the draft indicator are retrieved from the datastore (operations 15a, 15b, 16a, and/or 16b). One or more client notes are retrieved and transmitted to the customer system at operation 17a or 17b.

A case plan system 110 is illustrated as part of the case management system 150 and interfacing with a case management user system 130 by way of example and not limitation. The functions of the case plan system 110 could be separately implemented or integrated into other components in other configurations and arrangements. For example, the case plan system 110 can be integrated with a client notes system 120 within the case management system 150. The case plan system 110 is operative to handle generation, update, and management of objects and records for a case plan, goals, action items, program goal templates, goal templates, action item templates, and goal action item template, in relation with client object and client records.

The case plan system 110 enables a user of the case management system 150 to efficiently generate a case plan for a client based on goal templates and action item templates that are predefined for the organization to which the user belongs. In some implementations, the user is further able to customize the pre-defined goal and action items as needed. The user is also enabled to add custom goals and action items to the predefined goal templates and action item templates for a particular client. In some implementations, the case plan system 110 enables a user (such as an administrator for an organization) to define goal templates for one or more programs, and/or to define action item templates for one or more goal templates. The defined action item templates and/or goal templates are stored as records in the action item template object and/or the goal template object respectively. The records are accessed and retrieved to be made available to users of the organization at the time of generation of the case plan as it will be described in further detail below.

The implementations described herein provide a platform with an innovative combination of components in the context of case management in particular for non-profit organization. The platform allows users of the organization to efficiently record client notes that can be searched based on tags associated with each client note. The platform further allows a user to indicate whether the client note is a draft or not consequently enabling an efficient search for and access to incomplete client notes. The platform also allows the user to generate a case plan for the client based on template goals and action items that standardizes the case plans across multiple users and clients in the organization and greatly simplifies the process of case plan generation for a user.

Client Notes:

In some implementations the case management system 150 further includes a client notes system 120. The client notes system 120 in combination with the case management user system 130 allow a user to add a client note to be associated with a client. In some implementations, a client note object is a representation of data that the user can use to enter information related to a client. In some implementations, the information can be related to an interaction the user had with the client. In other implementations, the information can be independent of an interaction that the user may have had with the client. For example, a client note can be used by the user to enter unstructured information related to thoughts or observations of the user in relation to the client, the program the client is enrolled in, the case plan the client is following or other. A client note object includes multiple fields. A client note object may include a body field and a client field. The client field includes an identifier of the client for which the client note is generated, and the body field is used to store the information entered by the user. The client note object further includes a draft indicator field. The draft indicator field may include one of a set of binary values (e.g., "0" or "1", "draft" or "non-draft", etc.). A first one of the binary values indicates that the client note is still in draft form and is not yet complete. The second one of the binary values indicates that the client note is complete. In some implementations, the client note object may further include a client note identifier field. A value of the client note identifier field uniquely identifies a client note. A client note is a record of the client note object. In the description herein the client note record and the client note will be interchangeably used. A client note refers to a particular record of a client note object. In some implementations, the client note object may further include a tags field to store one or more tags added by the user for the client note. In other implementations, the tags may be generated as a different database object (e.g., a tags object) that is associated with records of the client note object.

Adding a New Client Note for a Client:

The case management user system 130 displays a GUI that allows a user (e.g., a case manager) to enter a new client note. The new client note can be generated as a result of interaction of the user with a client of the organization. The new client note can be generated for recording information regarding the client without occurrence of an interaction with a client. FIGS. 2A-3E illustrate multiple exemplary GUIs that enable the user to generate a new client note. In the following description, the GUIs of FIGS. 2A-3E will be described with reference to operations in the system 100 of FIG. 1A. However, the GUIs can be performed by implementations other than those discussed with reference to FIG. 1A, and the system of FIG. 1A can perform operations different than can result in graphical user interfaces that are different from the ones described with reference to FIGS. 2A-3E.

Figure 2A:
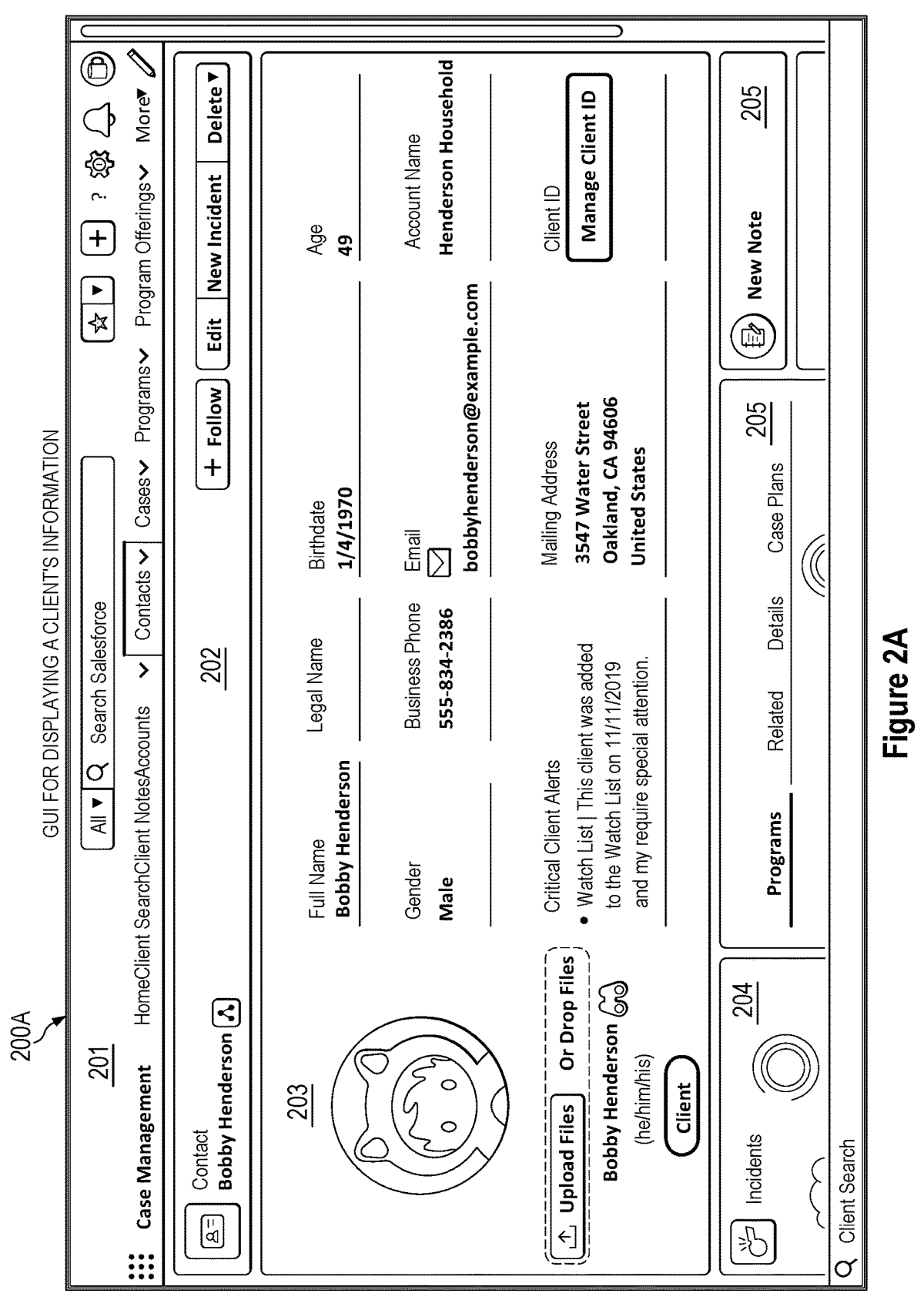

FIG. 2A illustrates an exemplary first GUI that allows a user to start a new client note. The GUI 200A includes several sections. For example, the GUI 200A includes a first section 201, a second section 202, a third section 203, a fourth section 204, a fifth section 205, and section 206. While the GUI illustrates sections 201 to 206, one or more of these sections may be optional and one or more of these sections can be placed at different locations within the GUI in other implementations. One or more of these sections can include one or more additional graphical elements that are not illustrated in FIG. 2A. Additionally or alternatively, one or more of these sections may include one or more less elements than the ones that are illustrated in FIG. 2A. The GUI 200A may include a first section 201, which can be referred to as a navigation bar, that allows a user to navigate through the different features offered by the case management service. For example, the first section 201 includes a "Home" tab, a "client search" tab, a "client notes" tab, an "accounts" tab, a "contacts" tab, a "cases" tab, a "programs" tab, a "program offerings" tab, and one or more additional tabs which are not illustrated and can be grouped under a dropped down list that is displayed when the "more" tab is selected. When a user selects any one of the discussed tabs, the GUI is updated to display corresponding elements. For example, sections 202-206 are displayed to a user for accessing details related to the client "Bobby Henderson." These sections allow the user to view and/or update information related to this client. In some implementations, sections 202-206 can be displayed when the user has selected the "Contacts" tab in the first section 201. Further, the illustrated sections 202-206 can be displayed as a result of the user selecting client Bobby Henderson from a list of clients (e.g., when the number of clients exceeds one). These preliminary operations of interaction of the user with the graphical user interface are not discussed in further detail herein and one of ordinary skill in the art would understand that one or several steps can be performed by a user to access the GUI 200A.

The GUI 200A may include a second section 202 that includes the name of the client (here Bobby Henderson), one or more additional elements such as an "edit" button for editing the client's record, a "new incident" button for adding an incident for the client, a "delete" button for deleting the client's record, and a "follow" button for following the client. The GUI 200A includes a third section 203 which displays information related to the client. In some implementations, the information displayed in section 203 can be retrieved from a client record stored in the case management datastore 140 upon the user requesting to view the client record "Bobby Henderson." The GUI 200A further includes section 204 and section 205. Section 204 allows a user to view/update any incidents that relate to the client. Section 205 allows a user to view/update programs, other related information, details and case plans for the client. The GUI 200A includes element 206, which when selected by the user allows the user to enter a new client note in relation with the client "Bobby Henderson." For example, selection of the element 206 causes GUI 300A to be displayed to allow the user to enter information for the new client note as described with reference to FIG. 3A. One of ordinary skill in the art would understand that while the graphical element (e.g., a button) "New note" is located in section 206 at a lower right corner of the GUI 200A, in other implementations, this graphical element can be located in other sections of the GUI 200A. In the illustrated GUI 200A one or more information that is displayed is a result of one or more requests (e.g., API request) sent to the client notes system 120 from the case management user system 130. In some implementations, the client notes system 120 is operative to retrieve the data from the case management datastore 140 (e.g., a database system) and transmit the data to the case management user system 130 to be displayed as part of the client notes generation GUI, such as GUI 200A.

Figure 2B:
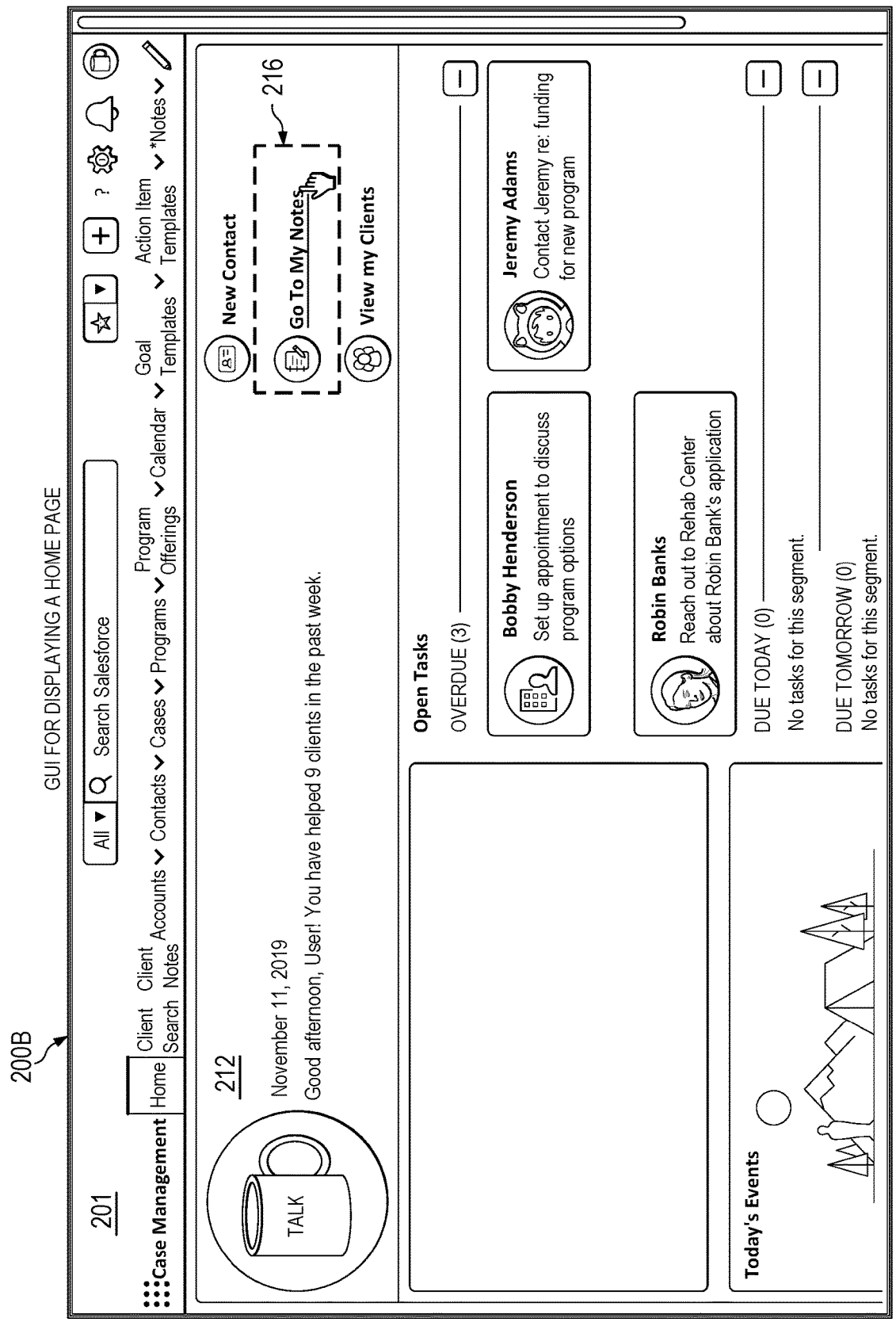
FIG. 2B illustrates an exemplary GUI that allows a user to add a new client note.

FIG. 2B illustrates a second exemplary GUI that allows a user to start a new client note. The GUI 200B includes several sections. For example, the GUI 200B includes the first section 201 and a second section 212. While the GUI 200B illustrates sections 201 to 212, one or more of these sections may be optional and one or more of these sections can be placed at different locations within the GUI in other implementations. One or more of these sections can includes one or more additional graphical elements that are not illustrated in FIG. 2B. Additionally or alternatively, one or more of these sections may include one or more less elements than the ones that are illustrated in FIG. 2B. The GUI 200B may include the first section 201 that is discussed with reference to FIG. 2A. When a user selects any one of the discussed tabs, the GUI is updated to display corresponding elements. For example, sections 212 and element 216 can be displayed when the user has selected the "Home" tab in the first section 201. These sections allow the user to have an overview of case management information.

Section 212 may include multiple graphical elements (e.g., buttons, images, links, etc.) that allow the user to get the overview over the case management information that he has access to. Further, section 212 includes graphical element 216. When the user selects the element 216, it allows the user to navigate to GUI 300A of FIG. 300A for entering a new client note.

FIG. 3A illustrates an exemplary GUI that allows a user to add a new client note. As discussed earlier, the GUI 300A can be displayed to the user when the user selects, a go to my notes link 216 in GUI 200B, the button "new note" 206 in GUI 200A, or select the tab "Client Notes" from the navigation bar 201 (as shown in FIG. 3A).

The graphical user interface 300A allows the user to enter a new client note by selecting the button "New" 303. The GUI 300A includes the first section 201, a second section 302 as a header of what is displayed in 306 and 3012. The GUI 300A further includes section 306, which includes sections 309 with a list of existing client notes previously generated by the user, and section 307a and 307b which are graphical elements allowing the user to search (307a) and/or filter (307b) the client notes.

The selection of the "New" button 303 results in the section 312 to be displayed. The user can use the graphical elements of section 312 to input information for the new client note. In the illustrated exemplary section 312, the user may input a title for the new client note in element 313. Using element 315, the user may select from a list of clients a client that is to be associated with the new client note. The selected client is shown in element 314 (Robin Banks, in this example). The user can use element 316 to enter a date for the interaction with the client, when applicable. In one example, a date is not entered as the new client note may be added by the user without occurrence of an interaction with the client. The user may use element 317 to enter a duration of time indicating the amount of time (e.g., in minutes, or other) spent with the client during the interaction. The user can use element 321 to enter additional unstructured details about the client. Typically the section 321 is referred to as a body of the client note and is used to enter any information related to the client that the user may want to keep track of. In some implementations, the body of the client note can include text, images por other multimedia data, and/or links. In some implementations, the client note interface 312 can further include additional graphical elements 318-320, 323, and 324. The graphical element 322 allows a user to delete the client note.

The user can select the graphical element 323 to indicate whether the new client note is a draft note (not yet completed). When the user checks the draft box for a client note this is a general indication that the user is to return to the client note at a later time to edit and complete editing of this client note. When the user does not select the graphical element 323 this is an indication that the client note is complete.

In some implementations, when the user enters the title, selects a client, enters interaction date, minutes spent with the client, and a description in the body section 321, a client note object can be generated to include the multiple values entered by the user in the respective fields of a client note object. In some implementations, one or more of these fields may not be present if the GUI does not present means for entering the associated information.

The graphical element 318 allows the user to enter one or more words as tags for the client note. For example, the user may enter a term "sister" in the tags box 318 and select the button 319 to add the tag "sister" to a list of tags associated with the client note being generated. In some implementations, the entered tags can be displayed as they are added (e.g., section 320). In some implementation, adding a tag can be enabled without the need for selecting a separate button (e.g., create 319) but instead can be performed by having the user pressing the "enter" key of the keyboard as they enter the text for the tag. In other implementations, a drop-down list of available tags can be presented to the user from which they can select one or more to be added to the list of tags for the client note. Several implementations can be used to allow the user to enter through the GUI 300A one or more tags for the client note. In some implementations, when the user enters the tags, these values can be added to a field of a client note object when the client note object includes the tag field. In these implementations, the tags are transmitted to the client notes system 120 to be stored in the case management datastore 140 as part of a client note record (e.g., in client notes object 145). For example, the client notes updater 122 upon receipt of the client note field values from the case management user system 130 updates the case management datastore 140. In other implementations, when the user enters the tags, the values of the tags cause generation of one or more record(s) of a new object (tag(s) object) that is different from the client note object. In some implementations, each tag entered by the user causes generation of a respective record of a tag object and is transmitted to the client notes system 120 to be stored (by the tags updater 124) as part of the tags database object 149.

Figure 3B:
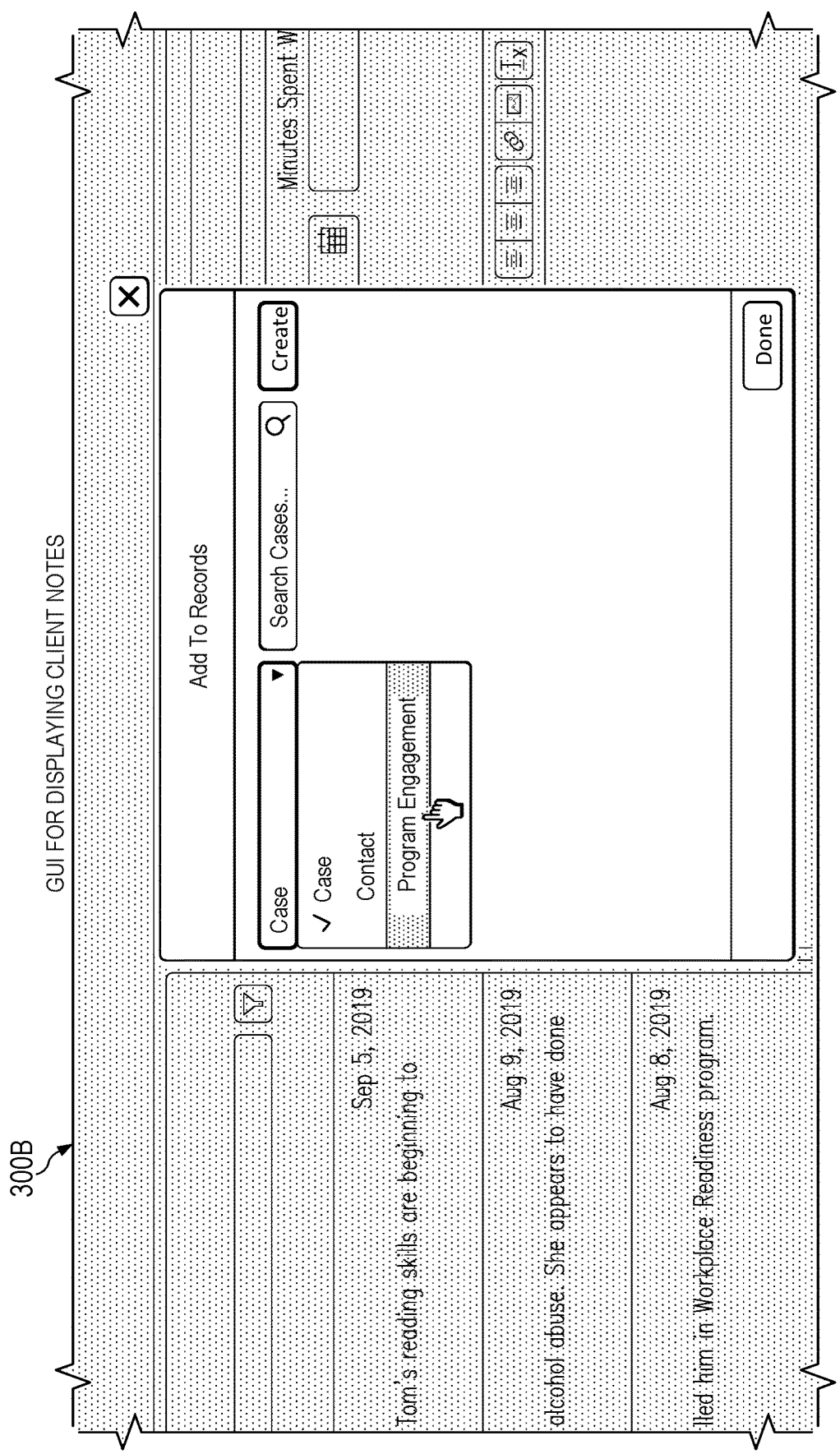
FIG. 3B illustrates a GUI that allows a user to select one or more additional records to be linked with a new client note.

The user can further select the "add to records" graphical element 324. When the user selects the graphical element 324, an updated GUI 300B is displayed as illustrated in FIG. 3B. FIG. 3B illustrate a GUI that allows a user to select one or more additional records to be linked with a new client note. The GUI 300B generally allows a user to select one or several records of objects that are to be linked with the new client note. For example, the GUI 300B may include element 331 and element 332. Graphical element 331 allows the user to select from a subset of objects offered by the case management system that can be associated with the new client note. The graphical element 332 allows the user to select a particular record of the selected object to be linked to the new client note.

In some implementations, the objects that are presented to the user for selection as part of the process of adding records to the new client note is configurable by an administrator of the case management system for the organization to which the user belongs. In some implementations, an administrator of the case management system may login into the system and update the client note object such that only a subset of all available objects in the case management system is visible and available to a user when adding records to a new client note. The administrator making the selection of the objects that can be linked with a new client note identifies objects that are relevant for client note objects. For example, in the case management system, it may be relevant to link a new client note associated with a given client with one or more programs that the client is enrolled in (e.g., when the note relates to the client in the context of those programs). In another example, it may relevant to link a new client note with a contact (e.g., another client, another user, or another participant in the case management system). Additionally or alternatively, it may be relevant to link a new client note with a case in the case management system. While linking the new client note to a case, a contact, or to a program, it may not be relevant to link the client note with other objects in the system such as (shipments, shifts, service crews, service resources, or other generic objects that may be present in the system). This greatly improves the user experience and efficiency of the user who is interacting with the case management system as it allows the user to quickly identify one or more objects that are to be linked to the new client note. Thus rendering the "add records" process of a new client note configurable allows for additional flexibility for an organization that uses the case management system and enables a simplification and improvement of the user experience by keeping the case management system organized and structured.

In some implementations, as the user enters values for the new client note (e.g., title, body, tags, selection of draft box, etc.) the graphical user interface is updated to show the new client note as it is being generated. For example, in FIG. 3A, as the user is entering the information title "Update on Robin's career search," tags "resume," and "sister," these values are displayed as new note 310 in the list of client notes 309.

Searching Client Notes:

The multiple features discussed above in relation to client notes enable a user to efficiently access different ones of the client notes recorded for a client. The user may need to access the client notes for further editing the client notes (e.g., when the client note is a draft) or for viewing the details of the client note. In some implementations, the GUI 300A allows a user of the case management system 150 to search for client notes in section 306. For example, section 306 allows the user to search by client name by entering a name in the search toolbar 307a. Several search criteria can be used by the user for obtaining the client notes.

Figure 3C:
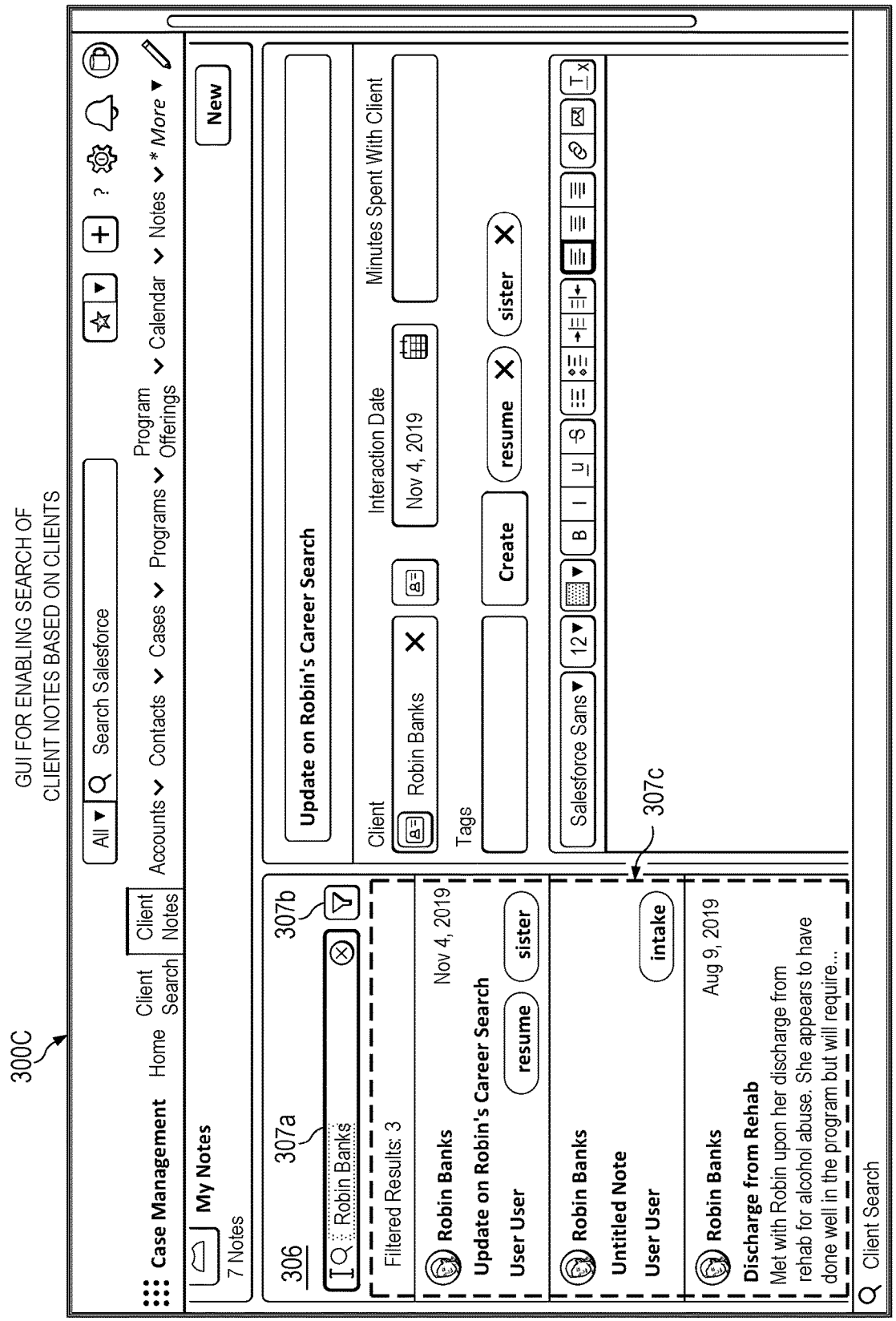
FIG. 3C illustrates an exemplary GUI that allows a user to search for client notes based on the name of a client.

FIG. 3C illustrates an exemplary GUI that allows a user to search client notes based on the name of a client. The user has entered the name robin banks in the search toolbar and as a result, the search results 307c are displayed. Each one of the client notes displayed is associated with the client "Robin Banks." Entering the name into the search toolbar causes client notes associated with a client that has that name to be displayed for the user. In some implementations, the display of the client notes results from one or more operations performed by the client notes system 120 and the case management user system 130. For example, entering the name into the search toolbar causes transmission of a request to the client notes system 120 for client notes that are associated with a client that has the entered name. Upon receipt of the request, the client notes system 120 retrieves the clients notes that have the particular name as a client field value. The retrieval of client notes from the datastore 140 can be performed by performing one or more query on the datastore 140 based on the client field value.

Figure 3D:
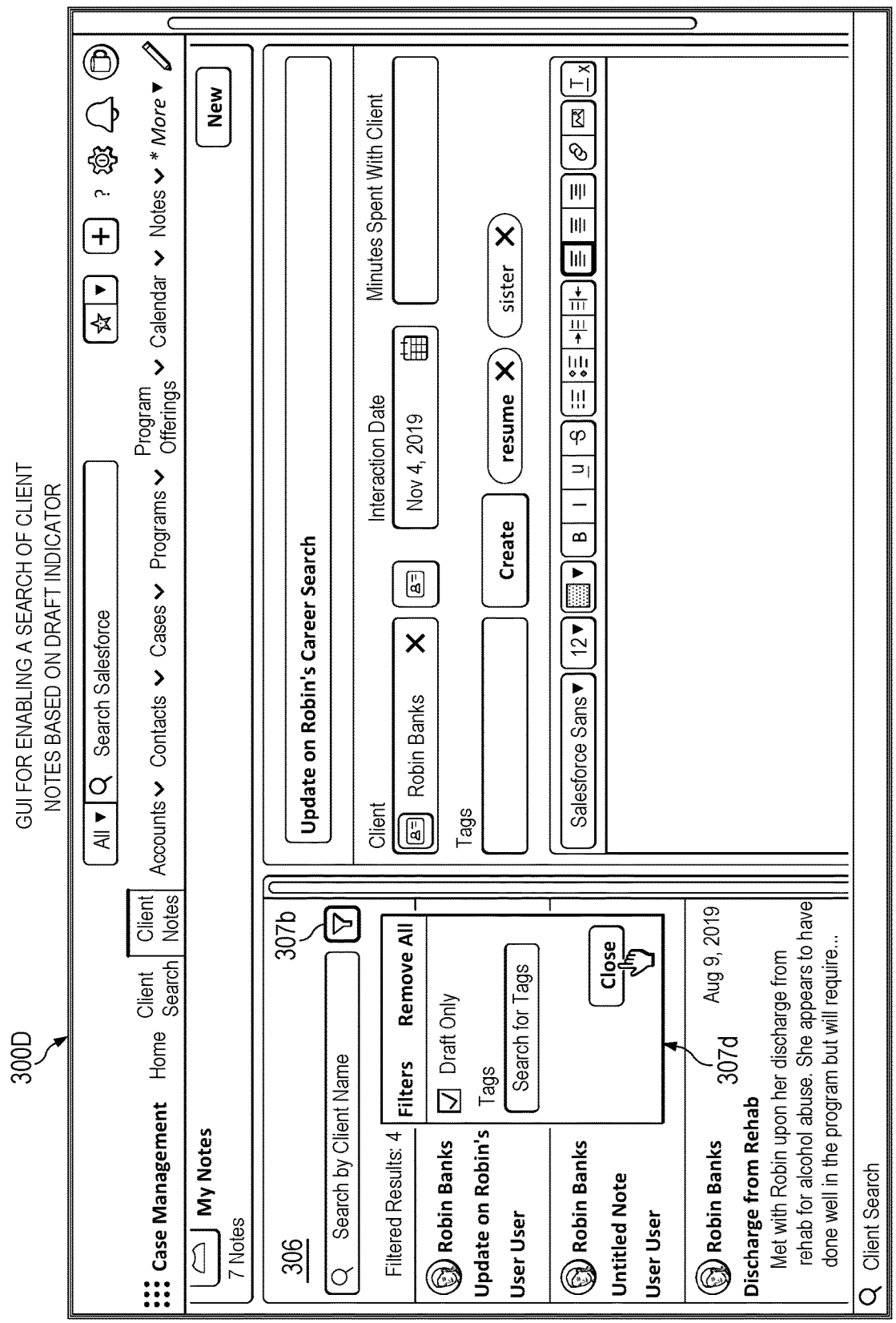
FIG. 3D illustrates an exemplary GUI that allows a user to search client notes based on a draft indicator.

Additionally or alternatively, section 306 allows a user to filter search results based on whether the client note is a draft or not. FIG. 3D illustrates an exemplary GUI 300D that allows a user to search client notes based on a draft indicator. As illustrated in FIG. 300C, a user can select the filter button 307b causing the graphical element 307d to be displayed. In the graphical element 307d, the user can select the "draft only" box. The selection of the draft only box causes draft client notes to be displayed for the user. In some implementations, the display of the draft client notes results from one or more operations performed by the client notes system 120 and the case management user system 130. For example, the selection of the draft only box causes transmission of a request to the client notes system 120 for client notes that are indicated as drafts. Upon receipt of the request, the client notes system 120 retrieves the clients notes that have a draft field value indicating that the client note is a draft. The retrieval of client notes from the datastore 140 can be performed by performing a query on the datastore 140 based on the draft field value. The implementation of the draft indicator as a one click selection for the user allows the user to quickly indicate that the client note is a draft without any ambiguity that may be otherwise caused by other implementations. For example, if the user were to enter a keyword or other indication in the title of the client note or in the body of the client or as a tag, there might not be a consensus between all of the users of the organization and therefore different users may use different keywords for indicating that the client note is complete. This will cause a user (who can be the same or a different one from the user that generated the client note) that is looking to retrieve draft client note for a particular client to fail identify all draft client notes when different terms were used. In contrast, the use of the one click draft box significantly improves the user experience of the case management system 150 by removing any ambiguity and allowing any user of the organization (with proper permission rights) to retrieve draft client notes through the one click search implementation.

Figure 3E:
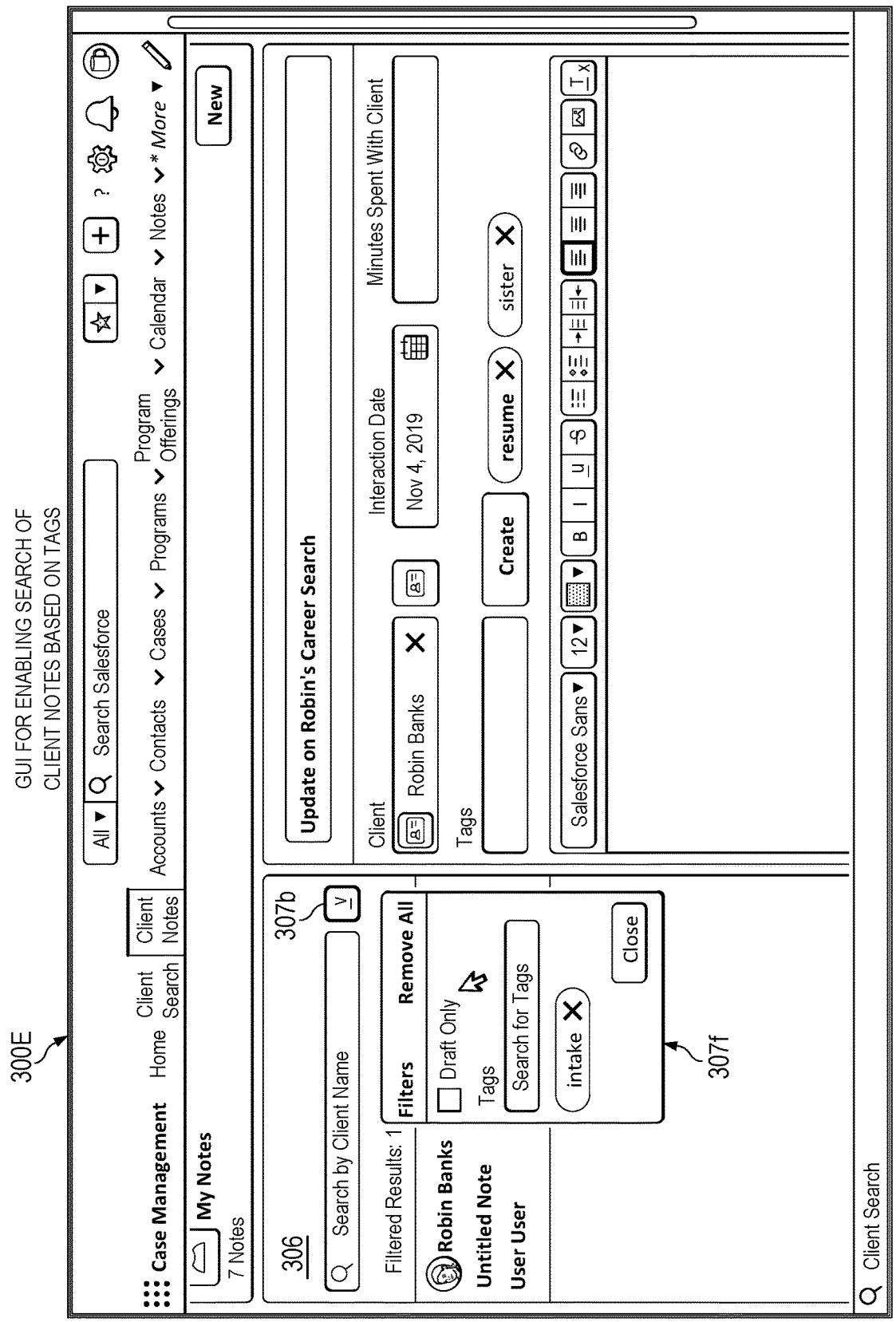
FIG. 3E illustrates an exemplary GUI that allows a user to search client notes based on one or more tags associated with the client note.

Additionally or alternatively, section 306 allows a user to filter search results based on whether the client note is a draft or not. FIG. 3E illustrates an exemplary GUI 300F for enabling a user to search client notes based on one or more tags associated with the client note. As illustrated in FIG. 3E, a user can select the filter button 307b causing the graphical element 307f to be displayed. In the graphical element 307f, the user enters in the tags search box a tag term, e.g., "intake." The entered tag (which can be referred to as a first tag) causes client notes associated with the entered tag to be displayed for the user. In some implementations, the display of the client notes associated with the first tag results from one or more operations performed by the client notes system 120 and the case management user system 130. For example, the selection of the draft only box causes transmission of a request to the client notes system 120 for client notes that are indicated as drafts. Upon receipt of the request, the client notes system 120 retrieves the clients notes that are associated with the first tag. The retrieval of client notes from the datastore 140 can be performed by performing one or more query on the datastore 140 based on the first tag. In some implementations, the queries can be performed to retrieve data forming one or more records of the client note object for the identified tag.

While the implementations herein have discussed with a user performing a search based on a single criteria this should not be considered as a limitation but is presented in the interest of simplicity and clarity. The implementations herein allow a user to perform a search of client notes based on more than one search criteria. For example, a user may search based on a combination of two or more of a client name, draft indicator, and tags.

Figure 4A:
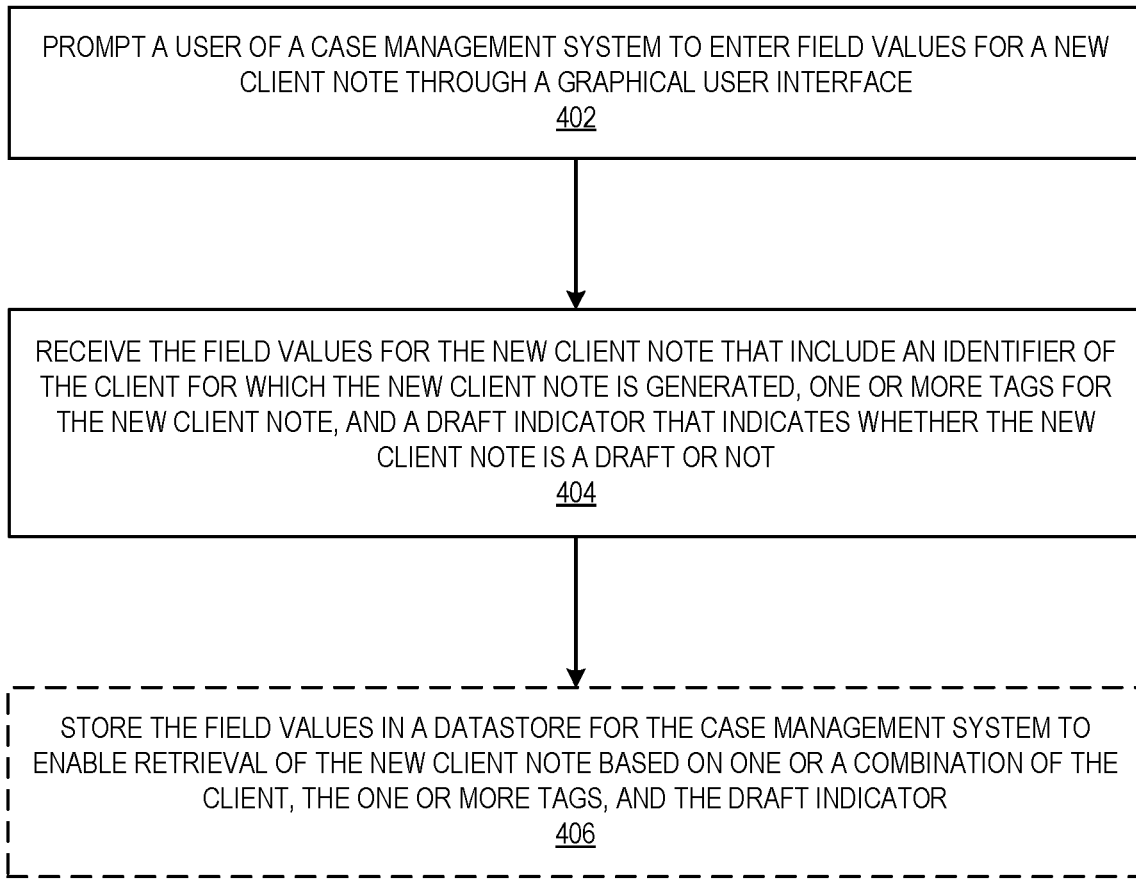
FIG. 4A illustrates a flow diagram of exemplary operations for adding a client note in accordance with some implementations.
Figure 4C:
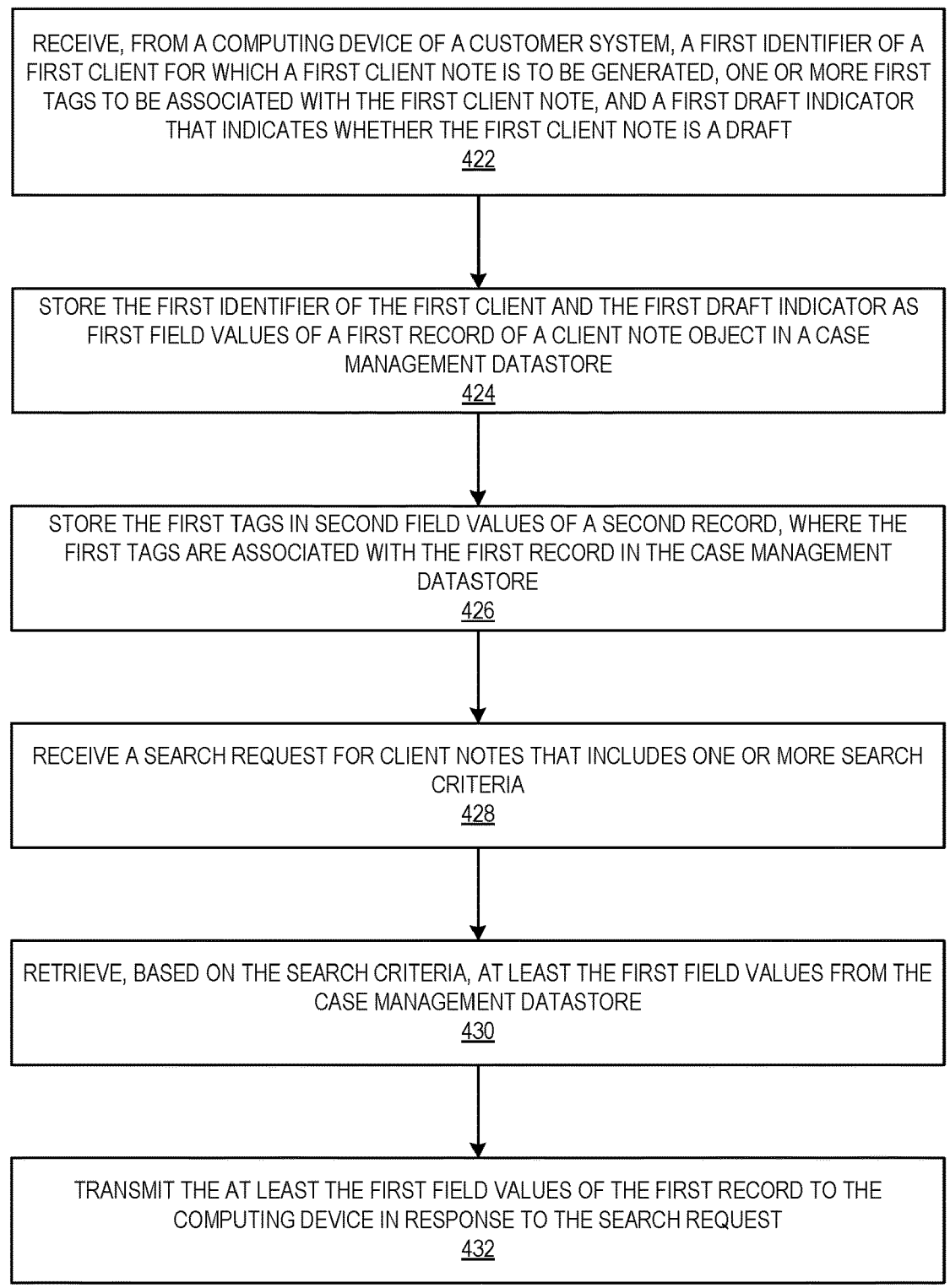
FIG. 4C illustrates a floe diagram of exemplary operations for client note generation and search in a case management system, in accordance with some implementations.

The operations in the flow diagrams of FIGS. 4A-C are described with reference to the exemplary implementations in the other figures, e.g., FIGS. 1A, and 2A-3E. However, the operations of the flow diagrams can be performed by implementations other than those discussed with reference to the other figures, and the implementations discussed with reference to these other figures can perform operations different than those discussed with reference to the flow diagrams.

FIG. 4A illustrates a flow diagram of exemplary operations for adding a client note in accordance with some implementations. At operation 402 a user of a case management system is prompted to enter field values for a new client note through a graphical user interface. The flow of operations moves to operation 404. At operation 404, the field values for the new client note that include an identifier of the client for which the new client note is generated, one or more tags for the new client note, and a draft indicator that indicates whether the new client note is a draft or not. The flow of operations moves to operation 406. At operation 406 the field values are stored in a datastore for the case management system to enable retrieval of the new client note based on one or a combination of the client, the one or more tags, and the draft indicator. In some implementations, the field values can be field values of a record of client note object. In other implementations, the field values received can be field values of a record of client note object in combination with field values of one or more records of another object (e.g., tag(s) object). The operations of FIG. 4A can be repeatedly performed for multiple client notes entered by one or more users of an organization. In some implementations, the case management system is a multi-tenant system and users of multiple organizations can cause the operations of FIG. 4A to be performed for the multiple organizations.

FIG. 4B illustrates a flow diagram of exemplary operations for searching a client note. At operation 412, a user of a case management system is prompted to enter search criteria for client notes that include a first tag associated with one or more client notes and a draft indicator that indicates that the client note is not completed. The flow of operations moves to operation 414. At operation 414, the search criteria are received. The flow of operations then moves to operation 416. At operation 416, one or more client notes that satisfy the search criteria that includes the first tag and the draft indicator are retrieved from the datastore.

FIG. 4C illustrates a flow diagram of exemplary operations for client note generation and search in a case management system, in accordance with some implementations. In some implementations, the operations of FIG. 4C include operations of FIGS. 4A-B and can be performed as described in further details with respect to the block diagrams of FIGS. 1, and 2A-3E. In other implementations, the operations of FIG. 4C can be performed by other systems than the one described with respect to FIG. 1A-3E without departing from the scope herein. At operation 422, a first identifier of a first client for which a first client note is to be generated, one or more first tags to be associated with the first client note, and a first draft indicator that indicates whether the first client note is a draft are received. The first identifier, the first draft indicator and the first tags are received from a computing device of a customer system (e.g., customer system 101). The flow of operations moves to operation 424, at which the first identifier of the first client and the first draft indicator are stored as first field values of a first record of a client note object in a case management datastore. The flow of operations moves to operation 426, at which the first tags is stored in second field values of a second record. The first tags are associated with the first record in the case management datastore. In some implementations, the second record is the first record and the second field values are fields of the first record. These second field values are stored in addition to the first field values for the same first record. In other implementations, the second record is different from the first record. The second record is a record of a tags object that is different from the client note object, and the client note object and the tags object are linked through a database relationship.

The flow of operations then moves to operation 428, at which a search request is received for client notes. For example, the search request can be received from the computing device of the customer system 101. The search request may be a request for draft client notes (e.g., client notes with draft indicator indicating that the client note is a draft). The search request may be a request for client notes associated with a first one from the first tags. The search request may be for client notes of a given client. The received request may include one or more search criteria. The search criteria may include the search criteria include at least one of a tag from the first tags, the first draft indicator, or the first identifier of the client. In some implementations, when the client note object includes additional fields and/or is linked with one or more other objects in the datastore 140, the search criteria may include one or more additional field types.

The flow of operations moves to operation 430, at which at least the first field values are retrieved from the case management datastore based on the search criteria. In some implementations, the at least first field values include the second field values. Alternatively or additionally, the at least the first field values include third field values of a third record that is of the client note object.

The flow of operations moves to operation 432, at which the at least the first field values of the first record are transmitted to the computing device in response to the search request. The transmission of the field values causes the display of the first client note on a graphical user interface of the customer system 101. In some implementations, when the at least first field values include the second field values, the transmission of the at least the first field values includes the transmission of the second field values, causing the first field values and the second field values to be displayed on a graphical user interface as the first client note. Alternatively or additionally, when the at least first field values include the third field values, the transmission of the at least the first field values includes the transmission of the third field values of the third record, causing the first field values and the third field values to be displayed on a graphical user interface as a first client note and a third client note that is different from the first client note.

Case Plan Generation and Update:

A case plan refers to a set of goals that a client can reach in order to achieve a given outcome. In some implementations, a case plan can depend on the type of services and/or case management the organization offers to their clients. For example, an organization can offer health services, social services, education services, and/or other types of services for which a client needs to be followed. In some examples, some or all of the services may not be offered by the organization itself but instead offered by other organizations, however a case manager of the organization can be in charge of following the programs to which a user is enrolled regardless of whether those programs fall under services offered by the organization or not. In this context, a case manager may be in charge of generating a case plan for a client and tracking the progress of the client. This is typically done in collaboration with the client.

In some implementations, a case plan for a client can be determined for one or more programs that the client is enrolled in. In these implementations a case plan can be linked to these programs such that progress in the case plan is tied to action items related to these programs. In other implementations, a case plan can be determined regardless of the programs in which the client is enrolled. A case plan object can include the following fields: a client field, a name field, an optional description field, an optional number of goals, an optional status. The client field includes an identifier of the client for which the case plan is to be generated. The name field includes a name entered by the user (which is typically a case manager) for the particular case plan when the case plan is generated. The description field includes a description for the case plan entered by the user. This description may include additional information for the case plan that is not included in the name field. The number of goals includes a count of the number of goals that are defined for this case plan. The status is determined for the case plan based on the status of one or more of the goals and/or actions associated with the case plan and is an indication of the progress of the client in this case plan. In some implementations, the status of the case plan is automatically determined based on the status of all of the goals and actions associated with the case plan. In other implementations, the status of the case plan is automatically determined based on the status of a subset of the goals and a subset of the actions associated with the case plan. In some implementations, the determination of a status of a case plan can be configurable by an administrator for the organization.

A goal object may include the following fields: a goal name field, a case plan field, a completed action items field, a client field, a goal template field, an incomplete action items field, a progress field. The goal name field is used to set a name for the goal. The case plan field is used to indicate an identifier or name of another case that is related to the case plan. For example, the case plan field may include an identifier of a case plan that is a child of the current case plan consequently linking the parent and the child case plans. The completed action items field indicates a count of all completed child action items. The client field is used to include an identifier of the client record for whom the case plan is generated. The goal template field is used to indicate the goal template that was used to generate the goal. The incomplete action items field is used to indicate a count of all non-completed action items. For example, the action items can be child records of the parent goal record. The progress field may be used to indicate a percentage of action items of the goal that are completed. In other implementations, one or more of the fields discussed above may omitted and/or additional fields may be added.

An action item object may include the following fields: a name field, a case plan field, a due date field, a client field, an action item template field, a status field, and a goal field. The case plan field is used to indicate an identifier or name of another case that is related to the case plan. The client field is used to include an identifier of the client record for whom the case plan is generated. The action item template field is used to indicate the action item template that was used to generate the action item. The status field is used to indicate progress of the client with respect to this action item. The goal field indicates the goal that is a parent of the action item. The action item is to be performed by a user to reach the goal indicated in this field. The goal and action item have a parent-child relationship in the data model on which the case management is based. Each one of the goal object and the action item object includes a case plan parent identifier field, which indicates the case plan under which the goal and the action items are defined.

In some implementations, a goal template database object, e.g., goal templates 142, is used to store goal template records in the case management datastore 140. In some implementations, the system 100 is a multi-tenant system and the goal template database object may store records associated with multiple organizations. Each goal template record may be defined by a user of the respective organization to which it belongs. For example, a goal template record (which is also referred to as a goal template) can be predefined by an administrator prior to the user or other users of the organization accessing the case plan system to generate a case plan for a client. In some implementations, the goal template record may be used to generate one or more goal records for one or more clients. In some implementations, the goal template database object is created based on the goal template object 166.

In some implementations, an action item is a record of an action item template database object, e.g., action item templates 143. In some implementations, the system 100 is a multi-tenant system and the action item template database object may store records associated with multiple organization. For example, an action item template record can be predefined by an administrator prior to the user or other users of the organization accessing the case plan system to generate a case plan for a client. In some embodiments, the action item template record may be used to generate one or more action item records for one or more goals of a client. In some implementations, the action item template database object is created based on the action item template object 167. Each one of the action item template and the goal template objects includes a respective action item name field and goal template name field.

Generating a New Case Plan:

While the operations of generation of a new case plan are described with reference to graphical user interface illustrated in FIGS. 5A-E, in other implementations, different graphical user interfaces can be used to perform the generation of a new case plan in a similar manner without departing from the scope of the present implementations.

Figure 5A:
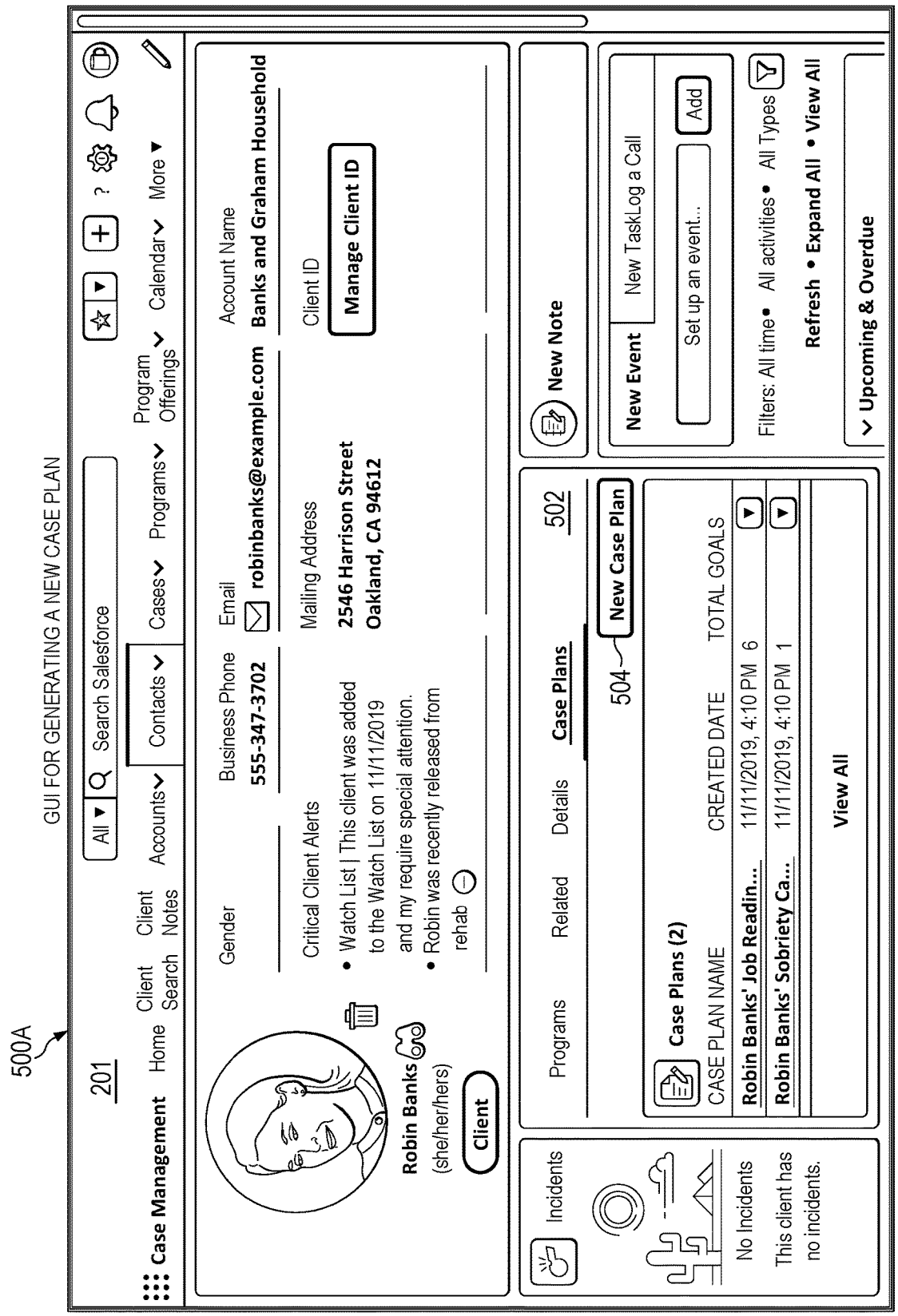
FIG. 5A illustrates an exemplary GUI that can be used by a user for generating a new case plan.

To enable generation of a new case plan, the case management user system 130 is operative to display a graphical user interface to a first user. The first user can be a case manager. FIG. 5A illustrates an exemplary GUI that can be displayed to the first user for generating a new case plan. The GUI 500A can be displayed upon the first user selecting the "contacts" tab in section 201 and selecting Robin Banks from a set of clients that the first user has access to. The first user selects the new case plan button 502. Upon selection of the new case plan button, the case management system causes display of GUI 500B.

Figure 5B:
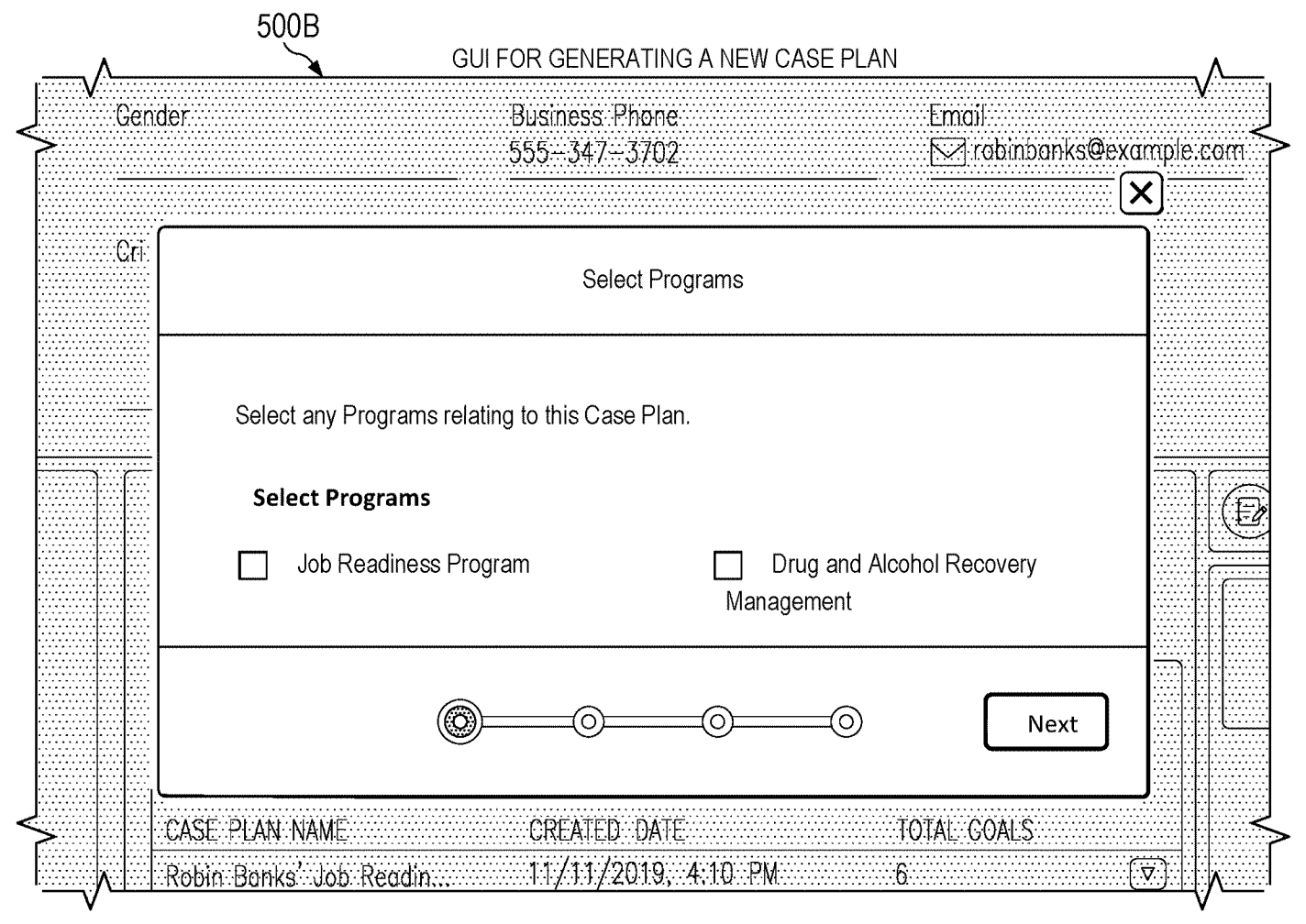

FIG. 5B illustrates an exemplary GUI that can be used by a user for selecting a program. In GUI 500B a set of programs for the identified client are displayed. In some implementations, the set of programs displayed results from the retrieval from the datastore 140 of the set of programs that are associated with the client that is identified. The retrieval of the set of programs can be performed by accessing one or more records in one or more of the database objects stored in the datastore 140. For example, the selection of the programs may result from retrieval of a record from the client database object 147 and looking up an associated database object that stores programs associated with the identified client. In some implementations, the client may not be associated with any programs (e.g., the client is not yet enrolled in a program, or the data model does not support programs, or the data model supports the generation of goals for a client independently of enrollment of the client in a program) and in that case the GUI 500B may not be displayed. When the set of programs is displayed, the first user selects one or more of the programs for the client. The first user may select a subset of all the programs, where the subset can be strictly less than all of the programs available or alternatively the subset can be all of the programs available to the client.

The selection of the programs selected by the first user through the graphical user interface is received by the case plan system 110. The case plan system 110 may retrieve based on the selected programs a set of goal templates for the client. These set of goal templates are automatically determined based on the selected one or more programs for the client. In some implementations, the goal templates determined are all the goal templates that are available in the case management system for the organization to which the first user belongs. For example, the case plan system 110 may retrieve from the goal templates object 142 all goal templates associated with the organization to which the first user belongs. For example, this may be the case if all programs are associated with the same set of goals. In other implementations, the goal templates determined are a subset of all of these goal templates and selected based on the selected programs. The case plan system 110 may retrieve from the goal templates object 142 the goal templates 142 for the programs that are selected by the first user. When the user has selected a single program, the case plan system 110 retrieves from the goal templates object 142, the goal templates that are associated with that particular program. In some implementations, this may involve accessing a program record in a programs object stored in the datastore 140 to retrieve identifiers of goal template records stored in the goal templates object 142. Alternatively, when the user has selected more than one program, e.g., a first and a second program, the case plan system 110 retrieves from the goal templates object 142, the goal templates that are associated with each one of these programs. For example, the case plan system 110 may retrieve for the first program a first set of goal templates from the goal templates object 142 and for the second program a second set of goal templates from the goal templates object 142. In some implementations, this may involve accessing a program record in a programs object stored in the datastore 140 to retrieve respective sets of identifiers of goal template records stored in the goal templates object 142 for each one of the first program and the second program and retrieving the first set and the second of goal templates based on these identifiers.

Figure 5C:
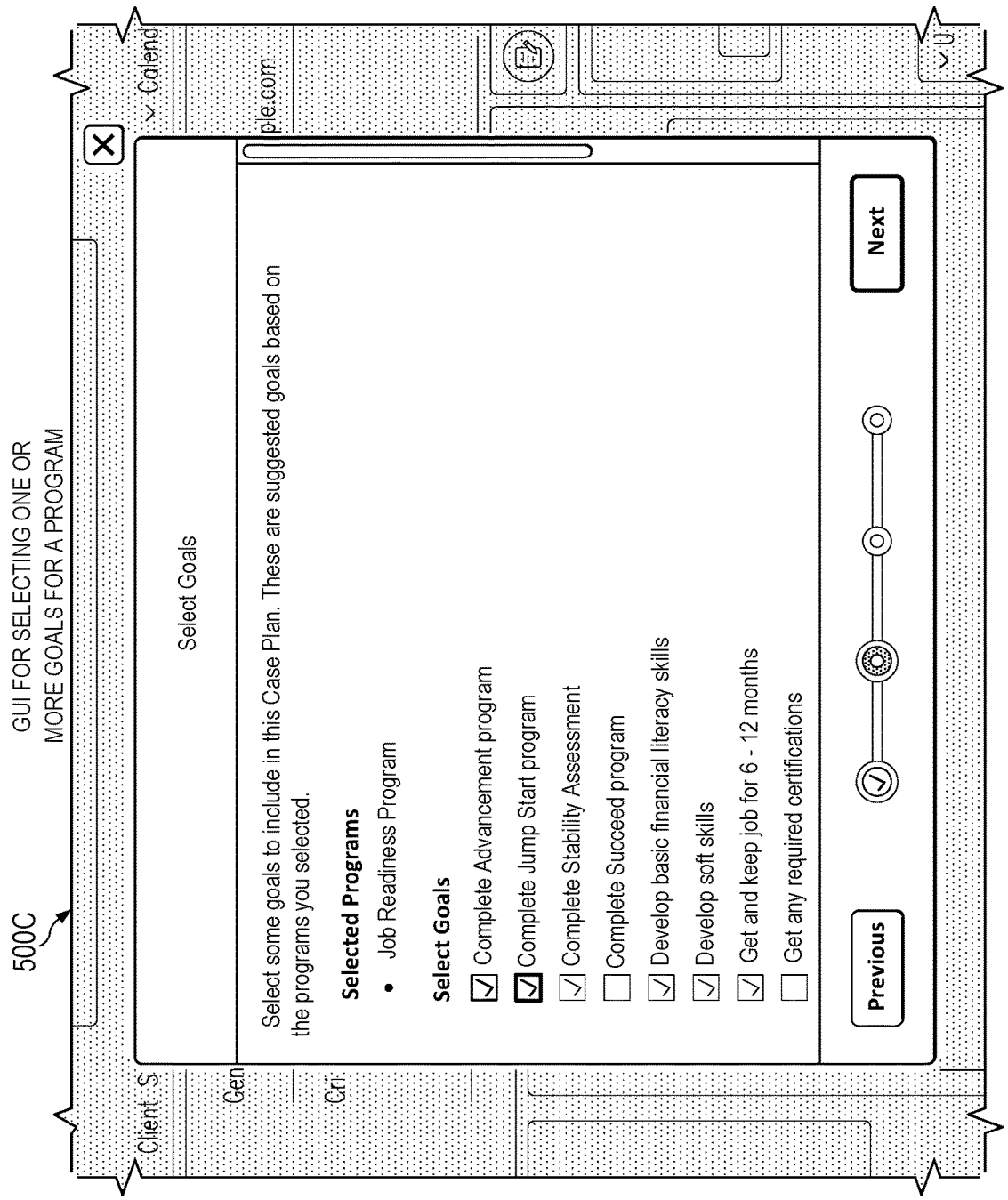
FIG. 5C illustrates an exemplary GUI that can be used by a user for selecting one or more goals for a program.

The set of goal templates for the client are displayed on the graphical user interface, e.g., 500C to allow the first user to select one or more of these goals. FIG. 5C illustrates an exemplary GUI that can be used by a user for selecting one or more goals for a program. In some implementations, as illustrated in FIG. 5C for each program that was selected by the first user, the determined set of goal templates is displayed. In FIG. 5C, the goal templates are displayed under the selected program "job readiness program" and the first user is allowed to select for that program one or more of the goal templates. In some implementations, the first user may be presented with a list of goal templates that are pre-selected (as they are mandatory goals for a particular program). The first user is then allowed to select additional goal templates, which are optional. In other implementations, the first user may select each one of the goal templates and there are no preselected goal templates.

Figure 5D:
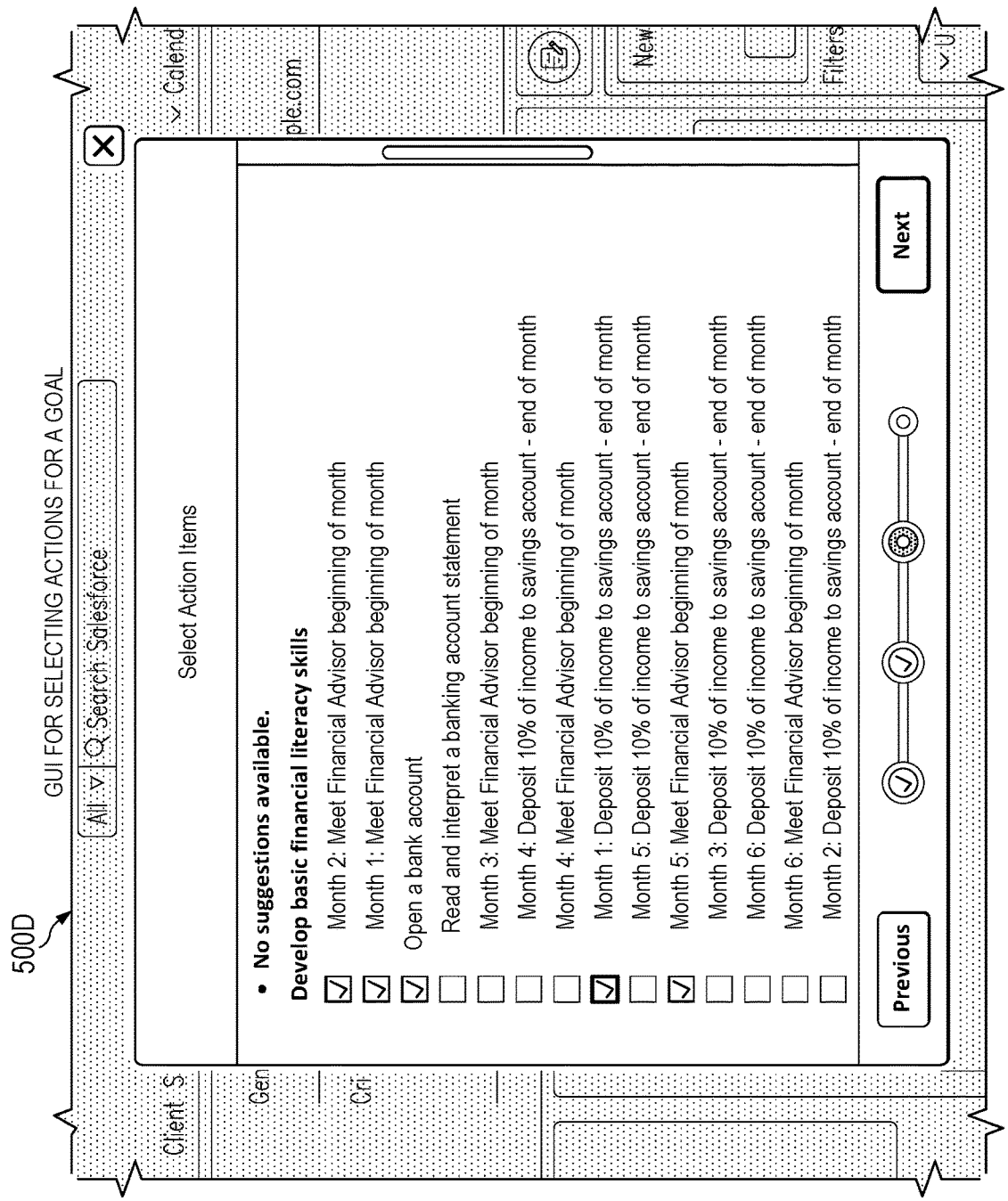
FIG. 5D illustrates an exemplary GUI that can be used by a user for selecting one or more action items for a goal.

The selected goal templates of the set of goal templates are received by the case management system and an automatic determination of a set of action item templates for each one of the goal templates from the selected goal templates is performed. The case plan system 110 may retrieve based on the selected goal templates, the set of action item templates for the client. In some implementations, the retrieval of the action item templates for each one of the goal templates is performed by accessing the datastore 140 and retrieving records from one or more of the database objects (e.g., goal template database object, the action item template object, etc.). The set of action items for each one of the selected goals are displayed on the graphical user interface, e.g., GUI 500D of FIG. 5D. FIG. 5D illustrates an exemplary GUI that can be used by a user for selecting one or more action items for a goal. The user selects a respective set of action items for each one of the goals. For example, when the subset of the goals (i.e., the selected goal from the set of goals) includes a first and a second goals, the case plan system 110 retrieves from the action item template database object 143, a first and a second set of action items, each associated with a respective one of the first and the second goal. In some implementations, this may involve accessing one or more goal records in the goal templates database object 142 stored in the datastore 140 to retrieve identifiers of action item template records stored in the action item template database object 143. The GUI is then updated to display 500E, that allows the first user to review and complete generation of the case plan.

Figure 5E:
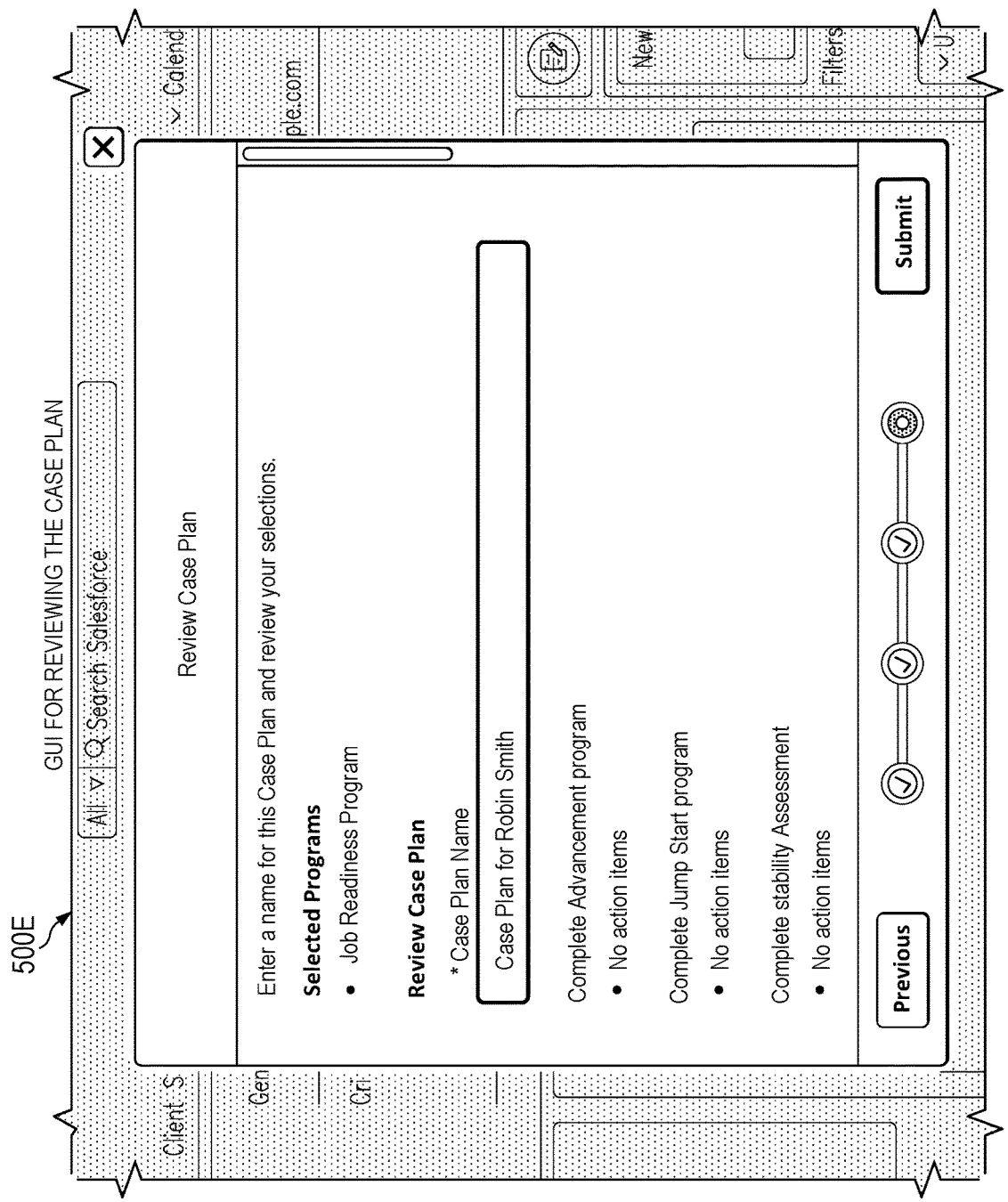
FIG. 5E illustrates an exemplary GUI that can be used by a user for reviewing the case plan.
Figure 5F:
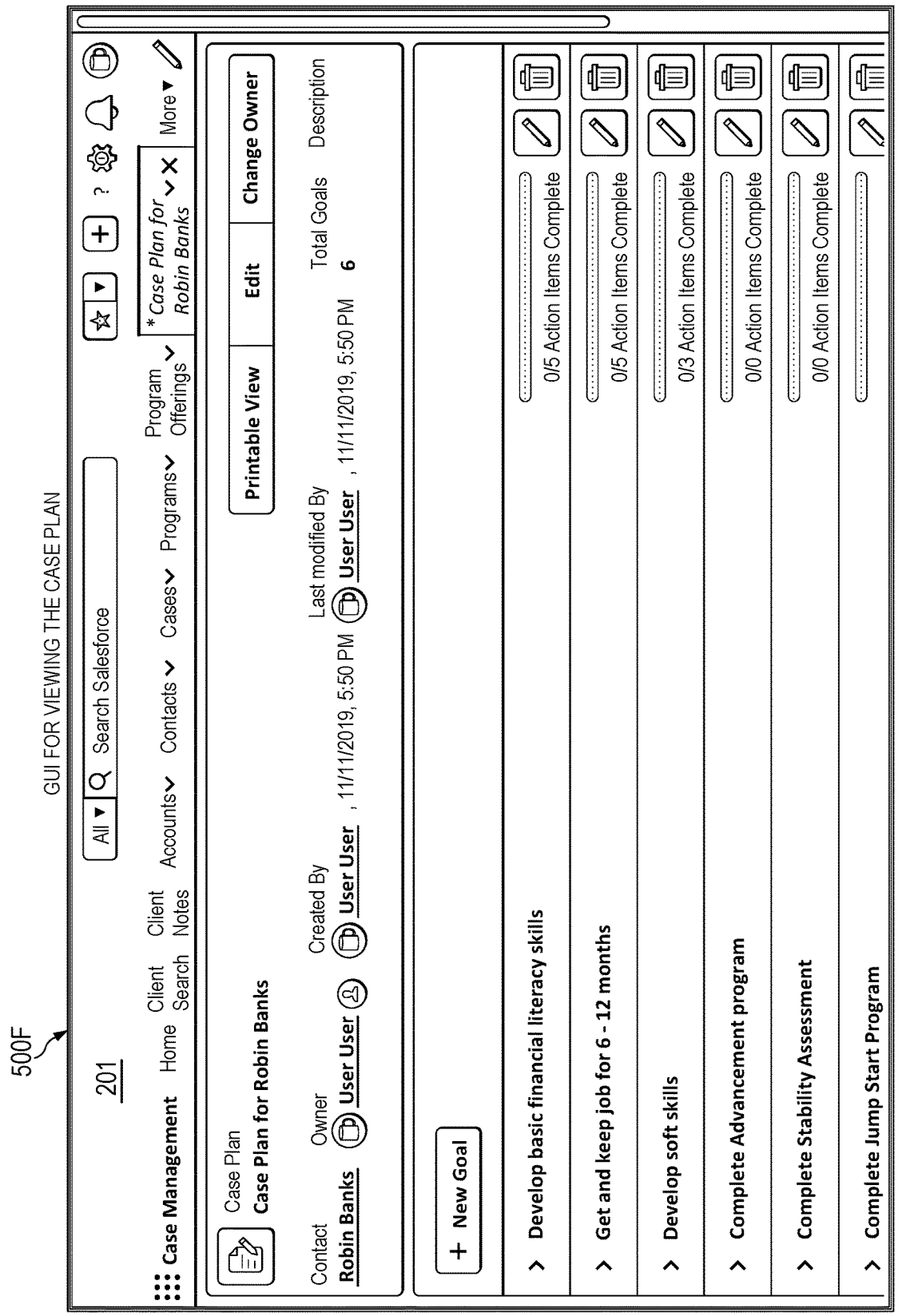
FIG. 5F illustrates an exemplary GUI that can be used by a user for viewing a case plan.

FIG. 5E illustrates an exemplary GUI that can be used by a user for reviewing the case plan. The first user enters a name for the case plan "Case plan for Robin Banks" and submit the case plan. The case management system receives the name for a case plan to be generated for the client, where the case plan includes the set of goals and one or more actions for each one of the one or more goals. In some implementations, the case management system further includes programs that are defined within the case plan, such that the goals are set as part of a program. The case management system stores the case plan in the datastore 140 to be used by one or more case managers for the client. The case plan can be stored as one or more records in the datastore 140. For example, storing the case plan may include operations performed in FIG. 6B described below. In another example, different operations can be performed to update one or more records in the datastore 140 for storing the case plan. The case plan can be displayed to the first user GUI 500F. FIG. 5F illustrates an exemplary GUI that can be used by a user for viewing a case plan. The first user may update or modify the case plan by selecting individual goals and action items. The first user may further view detailed action items for each one of the goals as illustrated in FIG. 5G, GUI 500G. The user may further use the case management system to update each one of the action items, goals, and/or add additional action items and/or goals that were not automatically generated.

Figure 6A:
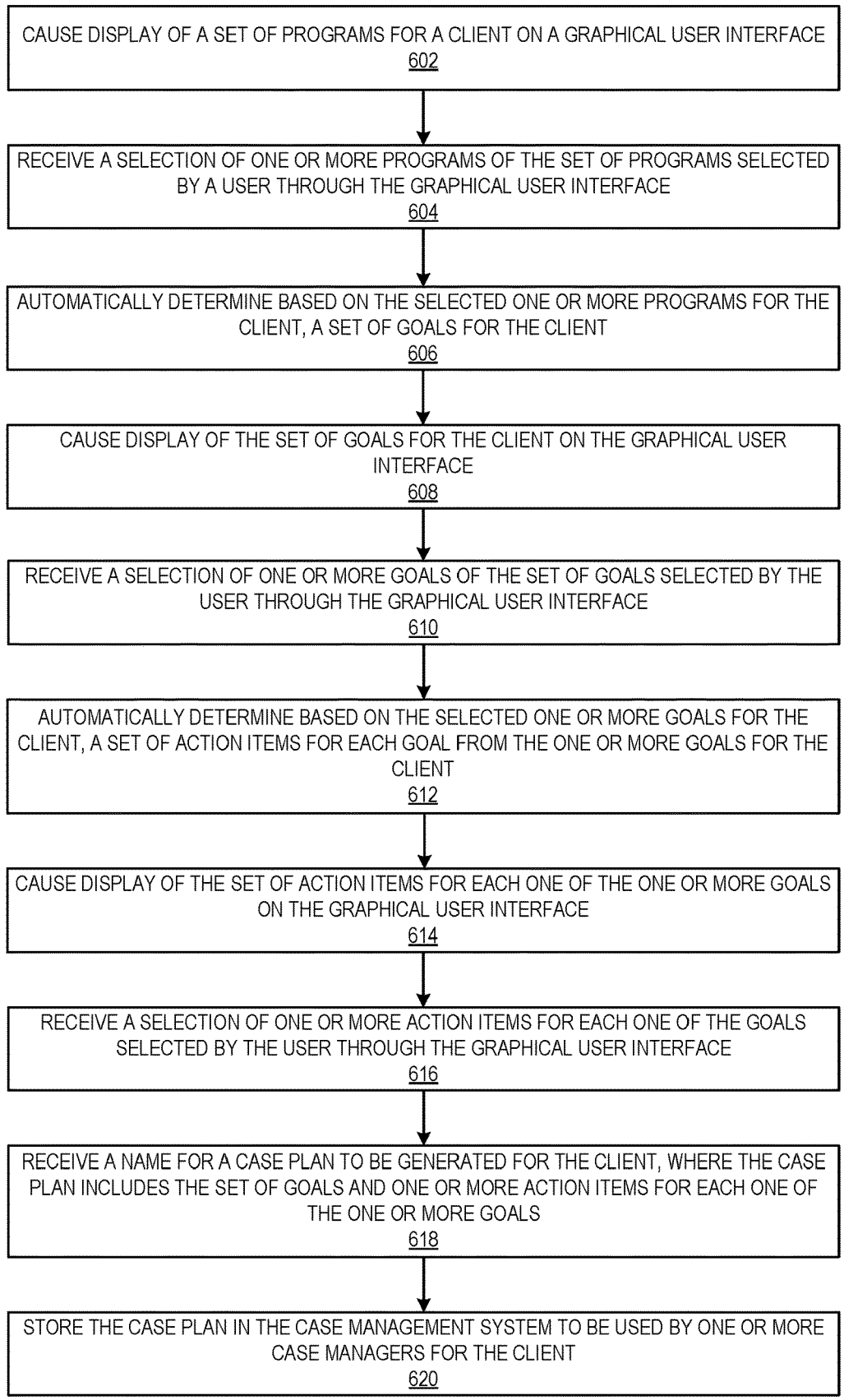
FIG. 6A illustrates a flow diagram of exemplary operations for generating a case plan.

FIG. 6A illustrates a flow diagram of exemplary operations for generation of a case plan. At operation 602, a set of programs for a client are displayed on a graphical user interface. At operation 604, a selection of one or more programs of the set of programs selected by a user through the graphical user interface is received. At operation 606, a set of goals for the client are automatically determined based on the selected one or more programs for the client. At operation 608, a set of goals for the client are displayed on the graphical user interface. At operation 610, one or more goals of the set of goals that are selected by the user through the graphical user interface are received. At operation 612, the case management system automatically determines based on the selected one or more goals for the client, a set of actions for each goal from the one or more goals for the client. The flow of operations moves to operation 614. At operation 614, the case management system causes display of the set of actions for each one of the one or more goals on the graphical user interface. The flow of operations then moves to operation 616. At operation 616, the case management system receives a selection of one or more actions for each one of the goals selected by the user through the graphical user interface. The flow of operations then moves to operation 618. At operation 618, the case management system receives a name for a case plan to be generated for the client, where the case plan includes the set of goals and one or more actions for each one of the one or more goals. The flow of operations then moves to operation 620. At operation 620, the case management system stores the case plan in the case management system to be used by one or more case managers for the client. In some implementations, storing the case plan includes storing the case plan as a first set of one or more records in the case management datastore 140 as it will be described in further details with respect to FIG. 6B.

FIG. 6B illustrates a flow diagram of exemplary operations performed for storing a case plan in the datastore 140, in accordance with some implementations. In some implementations, storing the case plan as the first set of records is performed based on the subset of goal templates, the subset of action item templates, and the case plan name and may include operations 622-627. At operation 622, the case plan system 110 stores the case plan as a case plan record in a case plan database object 148, where the case plan record includes an identifier of the client. The identifier of the client identifies the client record that represents the client for which the case plan is being generated. The client record may be stored in the clients database object 147. In some implementations, the case management system may be a multi-tenant system the client record may include an identifier of the organization to which the user creating the case plan for the client belongs to. In other implementations, the case management system may be a single tenant system, and the client record may not include an identifier of the organization.

The flow of operations moves to operation 624. At operation 624, the case plan system 110 stores the subset of goal templates for the case plan as a second set of one or more records in the case management datastore. In some implementations, the second set of records is a subset of the first set of records. In these implementations, the goal templates may be stored as field values of the case plan record. In other implementations, the goal templates may be stored as records of a different database object and the second set of records is different from the case plan records. For example, the case plan system 110 may store each one of the subset of goal templates as a goal record in a goals database object 144 based on goal object 162. The goal record includes an identifier of the case plan record. The identifier of the case plan record uniquely identifies the record associated with the case plan being generated for the client. In some implementations, the goal record may also include an identifier of the client record. In other implementations, the goal record does not include the identifier of the client record. In some implementations, the case management system may be a multi-tenant system the goal record may include an identifier of the organization to which the user creating the case plan for the client belongs to. In other implementations, the case management system may be a single tenant system, and the goal record may not include an identifier of the organization.

The flow of operations moves to operation 626. At operation 626, the case plan system 110 stores the subset of action item templates for the case plan as a third set of one or more records in the case management datastore. In some implementations, the third set of records is a subset of the first set of records. In these implementations, the action item templates may be stored as field values of the case plan record. In some implementations, the third set of records is a subset of the second set of records. In these implementations, the action item templates may be stored as field values of the goal records to which they are associated. Each action item template that is selected for a given goal template is stored as one or more field values of the goal record associated with that goal template. In other implementations, the action item templates may be stored as records of a database object that is different from the case plan database object and different from the goals database object. For example, in one implementation, the case plan system 110 may store, operation 227, each one of the subset of action item templates as an action item record in an action items database object 146. In some implementations, the action item records may have the format of an action item object 164. Each one of the action item records includes an identifier of the goal record. The identifier of the goal record uniquely identifies the record associated with the goal for which the action item template was selected. In some implementations, the action item record may also include an identifier of the case plan record. The identifier of the case plan record uniquely identifies the record associated with the case plan being generated for the client. In other implementations, the action item record does not include the case plan record. In some implementations, the action item record may also include an identifier of the client record. In other implementations, the action item record does not include the identifier of the client record. In some implementations, the case management system may be a multi-tenant system the action item record may include an identifier of the organization to which the user creating the case plan for the client belongs to. In other implementations, the case management system may be a single tenant system, and the action item record may not include an identifier of the organization. In some implementations, an action item record is a child record of a goal record in the datastore 140. The goal record is a parent of the child record in the datastore 140.

In some implementations, the case plan system 110 supports storing a goal and associated action items according to a new mechanism for saving a parent and child records. In a standard process for storing a parent record and one or more child records to create multiple records in such hierarchy: parent record data is first entered, a save button is clicked by the user causing the parent record to be stored. The user then navigates to a related list, e.g., related action items, and selects a button for the new child, the new child data is entered, the save button is clicked, and the process is repeated for each additional child record. This process requires numerous clicks from the user and multiple navigation events to complete the process, as well as multiple separate transactions in the datastore 140.

The case plan system 110 greatly simplifies this data entry scenario by allowing data for a parent goal record to be entered in the same form as the data for a child action item (see FIG. 5H). FIG. 5H illustrates an exemplary GUI that can be used by a user for viewing and/or updating a case plan. A new action item data entry line can be added to the form with a single button click. Further, all records, both parent goals and multiple children action items are committed to the database in a single transaction in response to a single click of the save button from the first user. Thus, the selection of the save button by a user causes the transmission of the data to the case plan system 110. The case plan system 110 requests the update of the goal record and adding the action item record (i.e., the child action item record of the goal record) in a single transaction in the datastore 140. For example, the transaction may include an instruction for adding the new action item record to the action item database object 146 and an instruction for updating of one or more fields of the goal record. In some implementations, more than one action items may be added as children to the goal record in the same transaction. In addition, the case plan system 110 allows for the modification of records in the same fashion. For example, edits and deletes of several action items and their associated goal are committed to the datastore 140 in a single transaction. To enable the batch transaction mechanism of a goal and corresponding action item, the client-side application (the case management user system (e.g., a JavaScript code)) caches the transaction details (e.g., each one of the action items (with corresponding field values), the goal, and/or optional program) and then transmits the cached details upon selection of the save button from the first user to the case plan system 110. The case plan system 110 (e.g., a back-end Apex controller) causes the transaction for the action items and the goal to be committed in the datastore 140. For example, the action item records and the goal record are updated, deleted, and/or added to one or more database objects in the datastore 140. In some implementations, the action item records and the goal record are committed in the action item database object 146 and in the goal database object 144 in the same transaction. Thus, the case plan system 110 enforces the atomic nature of the transaction and rolls-back any previous database commits if any one piece of the transaction fails.

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Example Environment

Figure 7A:
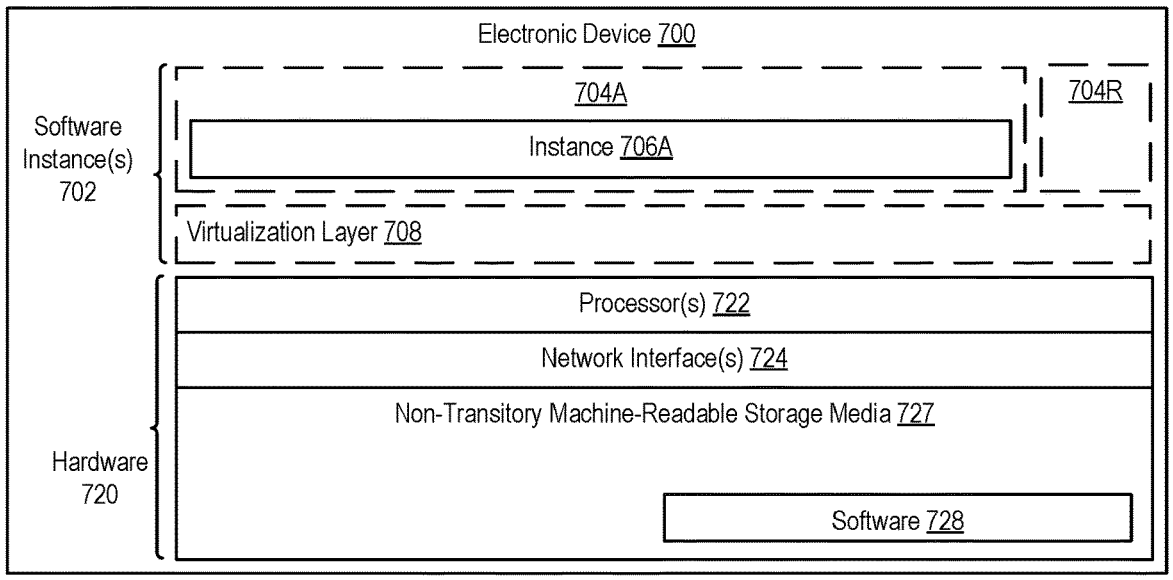
FIGS. 7A and 7B are diagrams of a multi-tenant distributed cloud computing platform supporting the case management system including the accounting management system.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described organization and user interactions with the case management system and the services and resources of the case management system itself may be implemented in one or more electronic devices 700. In one implementation: 1) each of the end user clients is implemented in a separate one of the electronic devices 700 (e.g., in user electronic devices operated by users of the tenant organization or organizations with supporting roles where the software 728 represents the software to implement end user clients to interface with the services and resources of the case management system (e.g., a web browser, a native client, a portal, a command-line interface, and/or an application program interface (API) based upon protocols such as Simple Object Access Protocol (SOAP), Representational State Transfer (REST), etc.)); 2) the services and resources of the case management system can be implemented in a separate set of one or more of the electronic devices 700 (e.g., a set of one or more server electronic devices where the software 728 represents the software to implement the service and resources of the case management system); and 3) in operation, the electronic devices implementing the end user clients and the case management services and resources would be communicatively coupled (e.g., by a network) and would establish between them (or through one or more other layers) connections for generations client notes and case plans for clients of an organization. Other configurations of electronic devices may be used in other implementations (e.g., an implementation in which the end user client and the case management system services are implemented on a set of shared electronic devices 700).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

Figure 7B:
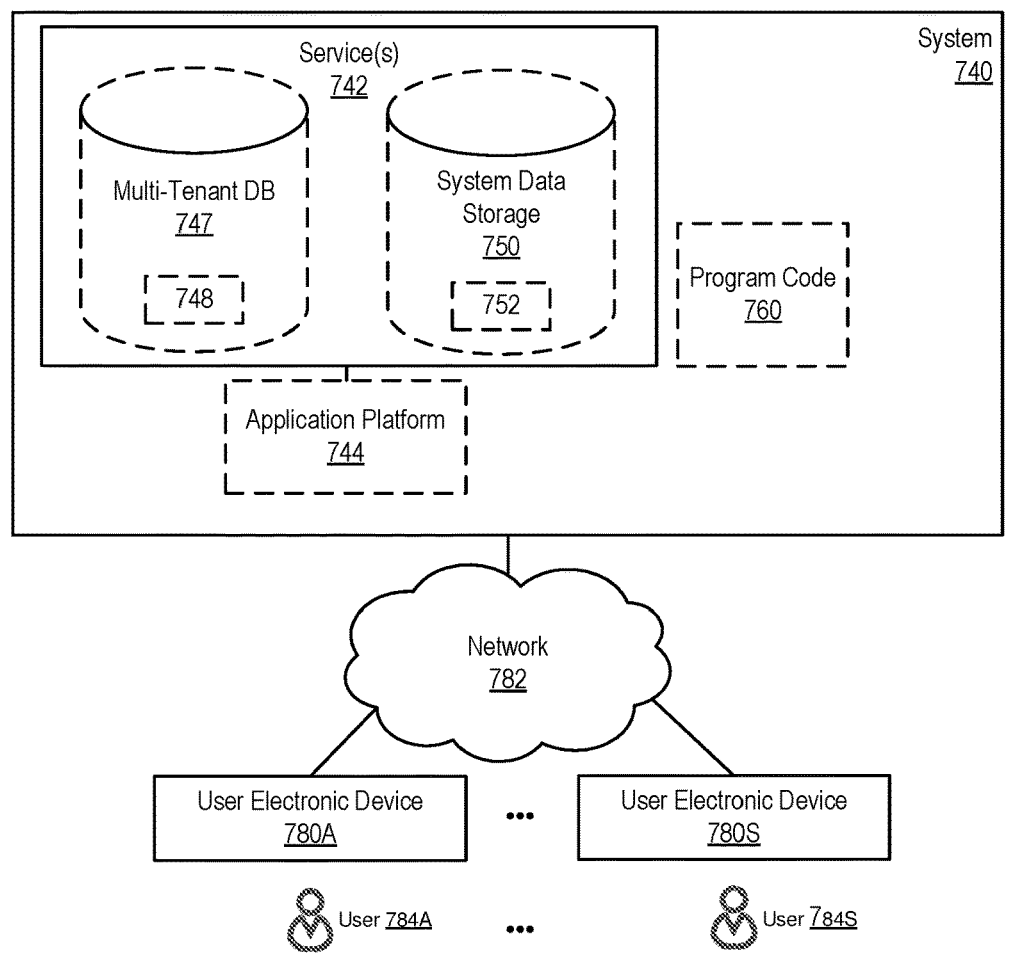

FIG. 7B is a block diagram of an environment where an end user clients or services and resources of the case management system may be deployed, according to some implementations. A system 740 includes hardware (a set of one or more electronic devices) and software to provide service(s) 742, including the implied case management system. The system 740 is coupled to user electronic devices 780A-S over a network 782. The service(s) 742 may be on-demand services that are made available to one or more of the users 784A-S working for one or more other organizations (sometimes referred to as outside users) so that those organizations do not need to necessarily be concerned with building and/or maintaining a system, but instead makes use of the service(s) 742 when needed (e.g., on the demand of the users 784A-S). The service(s) 742 may communication with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services, such as those of a case management system. In other implementations, similar services can be applied to other services deployed in similar architectures such as customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 544, users accessing the system 740 via one or more of user electronic devices 780A-S, or third-party application developers accessing the system 740 via one or more of user electronic devices 780A-S.

In some implementations, one or more of the service(s) 742 may utilize one or more multi-tenant databases 746 for tenant data 748, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the case management service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages and applications available to it from system 740 over network 782.

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computer implemented method of case plan generation for a client that is enrolled in one or more programs in a case management system comprising:

responsive to receiving a selection of a program of the programs from a computing device of a customer system operated by a user, retrieving, based on performing, in a program goal template database object, a look-up of a set of one or more records of a goal template database object that are associated with the program by determining a set of one or more records of the program goal template database object that each identifies the record of a program database object that corresponds to the program, a set of one or more goal templates from the set of records of the goal template database object, wherein each record of the program goal template database object identifies a record of the program database object and an associated record of the goal template database object, and wherein each of the program and goal template database object has a many-to-one relationship with the program goal template database object according to a data model of the case management system;

transmitting first data to the computing device to allow the user to select from the set of goal templates;

responsive to receiving from the computing device first selection data that indicates the one or more of the set of goal templates selected by the user, retrieving, based on performing, in a goal action item template database object, a look-up of a respective set of one or more records of an action item template database object that is associated with each of the selected one or more of the set of goal templates by determining a respective set of one or more records of the goal action item template database object that each identifies a record of a goal template database object that corresponds to a respective one of the selected one or more of the set of goal templates, a set of one or more action item templates from the respective sets of records of the action item template database object, wherein each record of the goal action item template database object identifies a record of the goal template database object and an associated record of the action item template database object, and wherein each of the goal template and action item template database object has a many-to-one relationship with the goal action item template database object according to the data model;

transmitting second data to the computing device to allow the user to select from the set of action item templates;

receiving, from the computing device, second selection data that indicates the one or more of the set of action item templates selected by the user; and generating records of one or more database objects for a case plan.

2. The computer implemented method of claim 1, wherein the generating records of one or more database objects for the case plan includes generating:

a set of one or more records of a goal database object that respectively reference those in the set of records of the goal template database object that respectively correspond to the selected one or more of the set of goal templates;

a set of one or more records of an action item database object that respectively reference those in the set of records of the action item template database object that respectively correspond to the selected one or more of the set of action item templates; and a record of a case plan database object, where the record of the case plan database object includes a case plan name and an identifier of the client.

3. The computer implemented method of claim 2, wherein each of the set of records of the goal database object includes an identifier of the record of the case plan database object.

4. The computer implemented method of claim 2, wherein each of the set of records of the action item object includes an identifier of the record of the case plan database object.

5. The computer implemented method of claim 2, wherein the record of the case plan database object includes one or more of a name field to store the case plan name, a description field, a number of goals field to store the number of the set of records of the goal database object for the case plan, and a status field to store a status value indicating progress of the client in this case plan.

6. The computer implemented method of claim 5, wherein the status value is determined for the case plan based on a status of one or more of the set of records of the goal database object and/or the set of records of the action item database object.

7. A non-transitory machine-readable storage medium that provides instructions that, if executed by a processor, will cause said processor to perform operations of case plan generation for a client that is enrolled in one or more programs in a case management system, the operations comprising:
responsive to receiving a selection of a program of the programs from a computing device of a customer system operated by a user, retrieving, based on performing, in a program goal template database object, a look-up of a set of one or more records of a goal template database object that are associated with the program by determining a set of one or more records of the program goal template database object that each identifies the record of a program database object that corresponds to the program, a set of one or more goal templates from the set of records of the goal template database object, wherein each record of the program goal template database object identifies a record of the program database object and an associated record of the goal template database object, and wherein each of the program and goal template database object has a many-to-one relationship with the program goal template database object according to a data model of the case management system;
transmitting first data to the computing device to allow the user to select from the set of goal templates;
responsive to receiving from the computing device first selection data that indicates the one or more of the set of goal templates selected by the user, retrieving, based on performing, in a goal action item template database object, a look-up of a respective set of one or more records of an action item template database object that is associated with each of the selected one or more of the set of goal templates by determining a respective set of one or more records of the goal action item template database object that each identifies a record of a goal template database object that corresponds to a respective one of the selected one or more of the set of goal templates, a set of one or more action item templates from the respective sets of records of the action item template database object, wherein each record of the goal action item template database object identifies a record of the goal template database object and an associated record of the action item template database object, and wherein each of the goal template and action item template database object has a many-to-one relationship with the goal action item template database object according to the data model;
transmitting second data to the computing device to allow the user to select from the set of action item templates;
receiving, from the computing device, second selection data that indicates the one or more of the set of action item templates selected by the user; and
generating records of one or more database objects for a case plan.

8. The non-transitory machine-readable storage medium of claim 7, wherein the generating records of one or more database objects for the case plan includes generating:
a set of one or more records of a goal database object that respectively reference those in the set of records of the goal template database object that respectively correspond to the selected one or more of the set of goal templates;
a set of one or more records of an action item database object that respectively reference those in the set of records of the action item template database object that respectively correspond to the selected one or more of the set of action item templates; and
a record of a case plan database object, where the record of the case plan database object includes a case plan name and an identifier of the client.

9. The non-transitory machine-readable storage medium of claim 8, wherein each of the set of records of the goal database object includes an identifier of the record of the case plan database object.

10. The non-transitory machine-readable storage medium of claim 8, wherein each of the set of records of the action item object includes an identifier of the record of the case plan database object.

11. The non-transitory machine-readable storage medium of claim 8, wherein the record of the case plan database object includes one or more of a name field to store the case plan name, a description field, a number of goals field to store the number of the set of records of the goal database object for the case plan, and a status field to store a status value indicating progress of the client in this case plan.

12. The non-transitory machine-readable storage medium of claim 11, wherein the status value is determined for the case plan based on a status of one or more of the set of records of the goal database object and/or the set of records of the action item database object.

13. A first computing device in a case management system, the first computing device implementing a method of case plan generation for a client that is enrolled in one or more programs, the first computing device comprising:
a non-transitory machine-readable medium having stored therein code; and
one or more processors coupled to the non-transitory machine-readable medium, the one or more processors to execute the code to perform the following operations:
responsive to receiving a selection of a program of the programs from a computing device of a customer system operated by a user, retrieving, based on performing, in a program goal template database object, a look-up of a set of one or more records of a goal template database object that are associated with the program by determining a set of one or more records of the program goal template database object that each identifies the record of a program database object that corresponds to the program, a set of one or more goal templates from the set of records of the goal template database object, wherein each record of the program goal template database object identifies a record of the program database object and an associated record of the goal template database object, and wherein each of the program and goal template database object has a many-to-one relationship with the program goal template database object according to a data model of the case management system, transmitting first data to the computing device to allow the user to select from the set of goal templates, responsive to receiving from the computing device first selection data that indicates the one or more of the set of goal templates selected by the user, retrieving, based on performing, in a goal action item template database object, a look-up of a respective set of one or more records of an action item template database object that is associated with each of the selected one or more of the set of goal templates by determining a respective set of one or more records of the goal action item template database object that each identifies a record of a goal template database object that corresponds to a respective one of the selected one or more of the set of goal templates, a set of one or more action item templates from the respective sets of records of the action item template database object, wherein each record of the goal action item template database object identifies a record of the goal template database object and an associated record of the action item template database object, and wherein each of the goal template and action item template database object has a many-to-one relationship with the goal action item template database object according to the data model, transmitting second data to the computing device to allow the user to select from the set of action item templates, receiving, from the second computing device, second selection data that indicates the one or more of the set of action item templates selected by the user, and generating records of one or more database objects for a case plan.

14. The first computing device of claim 13, wherein the generating records of one or more database objects for the case plan includes generating:

a set of one or more records of a goal database object that respectively reference those in the set of records of the goal template database object that respectively correspond to the selected one or more of the set of goal templates;

a set of one or more records of an action item database object that respectively reference those in the set of records of the action item template database object that respectively correspond to the selected one or more of the set of action item templates; and a record of a case plan database object, where the record of the case plan database object includes a case plan name and an identifier of the client.

15. The first computing device of claim 14, wherein each of the set of records of the goal database object includes an identifier of the record of the case plan database object.

16. The first computing device of claim 14, wherein each of the set of records of the action item object includes an identifier of the record of the case plan database object.

17. The first computing device of claim 14, wherein the record of the case plan database object includes one or more of a name field to store the case plan name, a description field, a number of goals field to store the number of the set of records of the goal database object for the case plan, and a status field to store a status value indicating progress of the client in this case plan.

18. The first computing device of claim 17, wherein the status value is determined for the case plan based on a status of one or more of the set of records of the goal database object and/or the set of records of the action item database object.

* * * * *